United States Patent
Venkatesh et al.

(10) Patent No.: US 12,131,192 B2
(45) Date of Patent: Oct. 29, 2024

(54) SCOPE-BASED DISTRIBUTED LOCK INFRASTRUCTURE FOR VIRTUALIZED FILE SERVER

(71) Applicant: Nutanix, Inc., San Jose, CA (US)

(72) Inventors: Anil Kumar Gopalapura Venkatesh, Pleasanton, CA (US); Manoj Premanand Naik, San Jose, CA (US); Sanath Kumar Kalligundi Shivaswamy, San Jose, CA (US); Uday Kiran Jonnala, San Jose, CA (US)

(73) Assignee: Nutanix, Inc., San Jose, CA (US)

( * ) Notice: Subject to any disclaimer, the term of this patent is extended or adjusted under 35 U.S.C. 154(b) by 109 days.

(21) Appl. No.: 17/443,009

(22) Filed: Jul. 19, 2021

(65) Prior Publication Data
US 2022/0300335 A1  Sep. 22, 2022

Related U.S. Application Data

(60) Provisional application No. 63/162,994, filed on Mar. 18, 2021.

(51) Int. Cl.
*G06F 9/50* (2006.01)
*G06F 11/07* (2006.01)
*G06F 11/30* (2006.01)

(52) U.S. Cl.
CPC .......... *G06F 9/5038* (2013.01); *G06F 9/5033* (2013.01); *G06F 11/0772* (2013.01); *G06F 11/3006* (2013.01)

(58) Field of Classification Search
CPC .. G06F 9/5038; G06F 9/5033; G06F 11/0772; G06F 11/3006
See application file for complete search history.

(56) References Cited

U.S. PATENT DOCUMENTS 5,095,421 A * 3/1992 Freund ................ G06F 11/1474
                                                714/E11.13
5,276,867 A    1/1994 Kenley et al.
(Continued)

FOREIGN PATENT DOCUMENTS

CN    103746997 A    4/2014
CN    105100210 A    11/2015
(Continued)

OTHER PUBLICATIONS

US 11,048,595 B2, 06/2021, Venkatesh et al. (withdrawn)
(Continued)

*Primary Examiner* — Benjamin C Wu
(74) *Attorney, Agent, or Firm* — Stoel Rives LLP

(57) ABSTRACT

This disclosure relates to scope-based lock management for shared resources of a distributed computing system. A scope-based lock manager may grant a request for a lock of a shared resource of the distributed computing system, where the lock request includes a scope of the lock and a target having the scope. The target may define entities able to access the shared resource when locked. The scope and target of the lock are stored at a lock database including scopes and targets associated with additional locks of additional shared resources of the distributed computing system. The scope based lock manager may determine when a computing node of the distributed computing system has failed and remove the lock from the lock database responsive to a determination that the target of the lock is hosted on the computing node.

25 Claims, 7 Drawing Sheets

(56) References Cited

U.S. PATENT DOCUMENTS

| | | | |
|---|---|---|---|
| 5,317,728 A | 5/1994 | Tevis et al. | |
| 5,533,036 A | 7/1996 | Blake et al. | |
| 5,596,754 A * | 1/1997 | Lomet | G06F 9/526 |
| | | | 710/200 |
| 5,664,144 A | 9/1997 | Yanai et al. | |
| 5,870,555 A | 2/1999 | Pruett et al. | |
| 5,873,085 A | 2/1999 | Enoki et al. | |
| 5,920,872 A * | 7/1999 | Grewell | G06F 9/52 |
| 5,924,096 A | 7/1999 | Draper et al. | |
| 6,055,543 A | 4/2000 | Christensen et al. | |
| 6,085,234 A | 7/2000 | Pitts et al. | |
| 6,101,508 A | 8/2000 | Wolff | |
| 6,108,654 A * | 8/2000 | Chan | G06F 9/52 |
| | | | 710/200 |
| 6,144,983 A * | 11/2000 | Klots | G06F 9/52 |
| | | | 718/104 |
| 6,212,531 B1 | 4/2001 | Blea et al. | |
| 6,289,356 B1 | 9/2001 | Hitz et al. | |
| 6,341,340 B1 | 1/2002 | Tsukerman et al. | |
| 6,412,034 B1 * | 6/2002 | Chan | G06F 9/52 |
| | | | 710/200 |
| 6,442,602 B1 | 8/2002 | Choudhry | |
| 6,473,849 B1 * | 10/2002 | Keller | G06F 13/1657 |
| | | | 712/30 |
| 6,539,381 B1 | 3/2003 | Prasad et al. | |
| 6,539,446 B1 * | 3/2003 | Chan | G06F 9/52 |
| | | | 710/200 |
| 6,963,914 B1 | 11/2005 | Breitbart et al. | |
| 6,968,345 B1 | 11/2005 | Muhlestein | |
| 7,120,631 B1 | 10/2006 | Vahalia et al. | |
| 7,159,056 B2 | 1/2007 | Goldick | |
| 7,162,467 B2 | 1/2007 | Eshleman et al. | |
| 7,337,290 B2 * | 2/2008 | Rajamani | G06F 9/526 |
| | | | 711/163 |
| 7,356,679 B1 | 4/2008 | Le et al. | |
| 7,366,738 B2 | 4/2008 | Yorke et al. | |
| 7,383,463 B2 | 6/2008 | Hayden et al. | |
| 7,409,511 B2 | 8/2008 | Edwards et al. | |
| 7,526,622 B1 | 4/2009 | Bonwick et al. | |
| 7,571,290 B1 | 8/2009 | Ranade et al. | |
| 7,606,868 B1 | 10/2009 | Le et al. | |
| 7,702,843 B1 | 4/2010 | Chen et al. | |
| 7,707,618 B1 | 4/2010 | Cox et al. | |
| 7,725,671 B2 | 5/2010 | Prahlad et al. | |
| 7,752,492 B1 | 7/2010 | Armangau et al. | |
| 7,774,391 B1 | 8/2010 | Le et al. | |
| 7,805,469 B1 | 9/2010 | Nagaralu et al. | |
| 7,805,511 B1 | 9/2010 | Panicker et al. | |
| 7,840,533 B2 | 11/2010 | Prahlad et al. | |
| 7,890,529 B1 | 2/2011 | Srinivasan et al. | |
| 7,937,453 B1 | 5/2011 | Hayden et al. | |
| 8,095,810 B2 | 1/2012 | Matsuzawa et al. | |
| 8,095,931 B1 | 1/2012 | Chen et al. | |
| 8,145,947 B1 | 3/2012 | Hayden et al. | |
| 8,352,482 B2 | 1/2013 | Hansen | |
| 8,352,608 B1 | 1/2013 | Keagy et al. | |
| 8,359,594 B1 | 1/2013 | Davidson et al. | |
| 8,365,167 B2 | 1/2013 | Beaty et al. | |
| 8,407,448 B1 | 3/2013 | Hayden et al. | |
| 8,447,728 B2 | 5/2013 | Prahlad et al. | |
| 8,473,462 B1 | 6/2013 | Banerjee | |
| 8,484,163 B1 | 7/2013 | Yucel et al. | |
| 8,484,356 B1 | 7/2013 | Douglis et al. | |
| 8,539,076 B2 | 9/2013 | Nakano et al. | |
| 8,543,790 B2 | 9/2013 | Chen et al. | |
| 8,549,518 B1 | 10/2013 | Aron et al. | |
| 8,595,595 B1 | 11/2013 | Grcanac et al. | |
| 8,601,473 B1 | 12/2013 | Aron et al. | |
| 8,620,870 B2 | 12/2013 | Dwarampudi et al. | |
| 8,635,351 B2 | 1/2014 | Astete et al. | |
| 8,646,089 B2 | 2/2014 | Jayanthi et al. | |
| 8,688,660 B1 | 4/2014 | Sivasubramanian et al. | |
| 8,725,679 B2 | 5/2014 | Nair et al. | |
| 8,751,515 B1 | 6/2014 | Xing et al. | |
| 8,762,335 B2 | 6/2014 | Prahlad et al. | |
| 8,805,951 B1 | 8/2014 | Faibish et al. | |
| 8,812,566 B2 | 8/2014 | Aizman et al. | |
| 8,838,923 B2 | 9/2014 | Prahlad et al. | |
| 8,850,130 B1 | 9/2014 | Aron et al. | |
| 8,863,124 B1 | 10/2014 | Aron | |
| 8,914,429 B2 | 12/2014 | Pitts | |
| 8,935,563 B1 | 1/2015 | Rajaa et al. | |
| 8,943,203 B1 | 1/2015 | Lent et al. | |
| 8,949,557 B2 | 2/2015 | Kamei et al. | |
| 8,966,188 B1 | 2/2015 | Bardale | |
| 8,983,952 B1 | 3/2015 | Zhang et al. | |
| 8,996,783 B2 | 3/2015 | Huang et al. | |
| 9,009,106 B1 | 4/2015 | Aron et al. | |
| 9,043,567 B1 | 5/2015 | Modukuri et al. | |
| 9,060,014 B2 | 6/2015 | Crowley | |
| 9,069,708 B2 | 6/2015 | Gill et al. | |
| 9,152,628 B1 | 10/2015 | Stacey et al. | |
| 9,154,535 B1 | 10/2015 | Harris | |
| 9,165,003 B1 | 10/2015 | Tummala et al. | |
| 9,171,019 B1 * | 10/2015 | Donlan | G06F 16/2343 |
| 9,201,698 B2 | 12/2015 | Ashok et al. | |
| 9,201,704 B2 | 12/2015 | Chang et al. | |
| 9,201,887 B1 | 12/2015 | Earl et al. | |
| 9,213,513 B2 | 12/2015 | Hartz et al. | |
| 9,229,850 B1 | 1/2016 | Wang et al. | |
| 9,244,674 B2 | 1/2016 | Waterman et al. | |
| 9,244,969 B1 | 1/2016 | Love et al. | |
| 9,250,823 B1 | 2/2016 | Kamat et al. | |
| 9,256,475 B1 | 2/2016 | Aron et al. | |
| 9,256,612 B1 | 2/2016 | Bhatt et al. | |
| 9,268,586 B2 | 2/2016 | Voccio et al. | |
| 9,268,947 B1 | 2/2016 | Jarlstrom et al. | |
| 9,274,817 B1 | 3/2016 | Fan et al. | |
| 9,286,298 B1 | 3/2016 | Gillett, Jr. | |
| 9,292,327 B1 | 3/2016 | Von Thenen et al. | |
| 9,336,132 B1 | 5/2016 | Aron et al. | |
| 9,348,702 B2 | 5/2016 | Hsu et al. | |
| 9,405,482 B2 | 8/2016 | Varadharajan et al. | |
| 9,405,566 B2 | 8/2016 | Chawla et al. | |
| 9,411,628 B2 | 8/2016 | Bezbaruah et al. | |
| 9,430,646 B1 | 8/2016 | Mushtaq et al. | |
| 9,448,887 B1 | 9/2016 | Ben Dayan et al. | |
| 9,497,257 B1 | 11/2016 | Love et al. | |
| 9,513,946 B2 | 12/2016 | Sevigny et al. | |
| 9,519,596 B2 | 12/2016 | Coppola et al. | |
| 9,535,907 B1 | 1/2017 | Stringham | |
| 9,563,555 B2 | 2/2017 | Flynn et al. | |
| 9,571,561 B2 | 2/2017 | Jang | |
| 9,600,307 B1 | 3/2017 | Pulkayath et al. | |
| 9,602,341 B1 | 3/2017 | Degwekar et al. | |
| 9,613,064 B1 | 4/2017 | Chou et al. | |
| 9,619,257 B1 | 4/2017 | Aron et al. | |
| 9,632,892 B1 | 4/2017 | Sledz et al. | |
| 9,634,990 B2 | 4/2017 | Lee | |
| 9,639,428 B1 | 5/2017 | Boda et al. | |
| 9,652,265 B1 | 5/2017 | Narayanasamy et al. | |
| 9,658,899 B2 | 5/2017 | Jenkins | |
| 9,690,670 B1 | 6/2017 | Paulzagade et al. | |
| 9,733,958 B2 | 8/2017 | Cui et al. | |
| 9,740,436 B2 | 8/2017 | Fiebrich-kandler et al. | |
| 9,740,472 B1 | 8/2017 | Sohi et al. | |
| 9,740,723 B2 | 8/2017 | Prahlad et al. | |
| 9,747,287 B1 | 8/2017 | Bhardwaj et al. | |
| 9,772,866 B1 | 9/2017 | Aron et al. | |
| 9,798,486 B1 | 10/2017 | Singh | |
| 9,832,136 B1 | 11/2017 | Gibson | |
| 9,846,706 B1 | 12/2017 | Basov et al. | |
| 9,853,978 B2 | 12/2017 | Tellvik et al. | |
| 9,870,291 B2 | 1/2018 | Bezbaruah et al. | |
| 9,893,988 B2 | 2/2018 | Agarwal et al. | |
| 9,922,201 B2 | 3/2018 | Von Muhlen et al. | |
| 9,940,154 B2 | 4/2018 | Ramani et al. | |
| 9,940,460 B1 | 4/2018 | Derbeko et al. | |
| 9,946,573 B2 | 4/2018 | Mcdermott | |
| 9,961,145 B1 | 5/2018 | Faibish et al. | |
| 9,965,357 B1 | 5/2018 | Earl et al. | |
| 10,009,215 B1 | 6/2018 | Shorey | |
| 10,019,159 B2 | 7/2018 | Wires et al. | |

(56) References Cited

U.S. PATENT DOCUMENTS

| | | |
|---|---|---|
| 10,050,862 B2 | 8/2018 | Nambiar et al. |
| 10,083,022 B2 | 9/2018 | Fukui et al. |
| 10,084,873 B2 | 9/2018 | Domemann |
| 10,095,506 B2 | 10/2018 | Gopalapura Venkatesh et al. |
| 10,101,989 B2 | 10/2018 | Sinha et al. |
| 10,114,706 B1 | 10/2018 | Chougala et al. |
| 10,127,059 B2 | 11/2018 | Astete et al. |
| 10,140,115 B2 | 11/2018 | Fukui et al. |
| 10,152,233 B2 | 12/2018 | Xu et al. |
| 10,210,048 B2 | 2/2019 | Sancheti |
| 10,248,657 B2 | 4/2019 | Prahlad et al. |
| 10,262,023 B1 | 4/2019 | Kuang et al. |
| 10,311,153 B2 | 6/2019 | Mason, Jr. et al. |
| 10,333,901 B1 | 6/2019 | Bauman et al. |
| 10,367,753 B2 | 7/2019 | Schultze et al. |
| 10,394,547 B2 | 8/2019 | Fukui et al. |
| 10,409,653 B2 | 9/2019 | Von Muhlen et al. |
| 10,419,426 B2 | 9/2019 | Bakshan et al. |
| 10,452,456 B2 | 10/2019 | Von Muhlen et al. |
| 10,496,321 B2 | 12/2019 | Varadharajan et al. |
| 10,523,592 B2 | 12/2019 | Byers et al. |
| 10,530,742 B2 | 1/2020 | Shah et al. |
| 10,540,164 B2 | 1/2020 | Bafna et al. |
| 10,540,165 B2 | 1/2020 | Bafna et al. |
| 10,540,166 B2 | 1/2020 | Arikatla et al. |
| 10,552,266 B1 | 2/2020 | Kogtev et al. |
| 10,572,317 B2 | 2/2020 | Von Muhlen et al. |
| 10,579,443 B2 | 3/2020 | Von Muhlen et al. |
| 10,635,544 B1 | 4/2020 | Kitson |
| 10,642,800 B2 | 5/2020 | Gummaraju et al. |
| 10,678,651 B1 | 6/2020 | Borodin et al. |
| 10,705,889 B2 | 7/2020 | Von Muhlen et al. |
| 10,719,305 B2 | 7/2020 | Sinha et al. |
| 10,719,306 B2 | 7/2020 | Deshmukh et al. |
| 10,719,307 B2 | 7/2020 | Kanada et al. |
| 10,728,090 B2 | 7/2020 | Deshmukh et al. |
| 10,789,138 B2 | 9/2020 | Wang et al. |
| 10,809,998 B2 | 10/2020 | Gopalapura Venkatesh et al. |
| 10,824,455 B2 | 11/2020 | Arikatla et al. |
| 10,831,465 B2 | 11/2020 | Sharpe et al. |
| 10,838,708 B2 | 11/2020 | Sinha et al. |
| 10,949,192 B2 | 3/2021 | Gopalapura Venkatesh et al. |
| 10,949,387 B1 | 3/2021 | Grider |
| 11,025,626 B1 | 6/2021 | Todd et al. |
| 11,074,138 B2 | 7/2021 | Alonzo et al. |
| 11,086,826 B2 | 8/2021 | Thummala et al. |
| 11,106,442 B1 | 8/2021 | Gupta et al. |
| 11,106,447 B2 | 8/2021 | Gupta et al. |
| 11,204,710 B2 | 12/2021 | Varadharajan et al. |
| 11,281,484 B2 | 3/2022 | Bafna et al. |
| 11,288,239 B2 | 3/2022 | Bafna |
| 11,294,777 B2 | 4/2022 | Venkatesh et al. |
| 11,474,796 B1 | 10/2022 | Mather |
| 11,537,384 B2 | 12/2022 | Sharpe et al. |
| 11,544,049 B2 | 1/2023 | Gopalapura Venkatesh et al. |
| 11,546,337 B2 | 1/2023 | Le et al. |
| 11,550,557 B2 | 1/2023 | Sharpe et al. |
| 11,550,558 B2 | 1/2023 | Bafna et al. |
| 11,550,559 B2 | 1/2023 | Bafna et al. |
| 11,562,034 B2 | 1/2023 | Arikatla et al. |
| 11,563,800 B1 * | 1/2023 | Trendafilov ............ H04L 47/82 |
| 11,568,073 B2 | 1/2023 | Nair et al. |
| 11,579,861 B2 | 2/2023 | Sharpe et al. |
| 11,609,826 B2 | 3/2023 | Alonzo et al. |
| 11,645,065 B2 | 5/2023 | Gupta et al. |
| 11,669,320 B2 | 6/2023 | Gopalapura Venkatesh et al. |
| 11,675,746 B2 | 6/2023 | Thummala et al. |
| 11,775,397 B2 | 10/2023 | Venkatesh et al. |
| 11,922,157 B2 | 3/2024 | Sharpe et al. |
| 11,922,203 B2 | 3/2024 | Bafna et al. |
| 2001/0047400 A1 | 11/2001 | Coates et al. |
| 2002/0069196 A1 | 6/2002 | Betros et al. |
| 2002/0120763 A1 | 8/2002 | Miloushev et al. |
| 2003/0033308 A1 | 2/2003 | Patel et al. |
| 2003/0115218 A1 | 6/2003 | Bobbitt et al. |
| 2003/0163597 A1 | 8/2003 | Hellman et al. |
| 2003/0195942 A1 | 10/2003 | Muhlestein et al. |
| 2004/0054777 A1 | 3/2004 | Ackaouy et al. |
| 2004/0111608 A1 | 6/2004 | Oom et al. |
| 2004/0199734 A1 | 10/2004 | Rajamani et al. |
| 2004/0210591 A1 | 10/2004 | Hirschfeld et al. |
| 2004/0225742 A1 | 11/2004 | Loaiza et al. |
| 2004/0267832 A1 | 12/2004 | Wong et al. |
| 2005/0120160 A1 | 6/2005 | Plouffe et al. |
| 2005/0120180 A1 | 6/2005 | Schornbach et al. |
| 2005/0125503 A1 | 6/2005 | Iyengar et al. |
| 2005/0193221 A1 | 9/2005 | Yoneyama |
| 2005/0193245 A1 | 9/2005 | Hayden et al. |
| 2005/0226059 A1 | 10/2005 | Kavuri et al. |
| 2005/0228798 A1 | 10/2005 | Shepard et al. |
| 2006/0010227 A1 | 1/2006 | Atluri |
| 2006/0047685 A1 | 3/2006 | Dearing et al. |
| 2006/0080445 A1 | 4/2006 | Chang et al. |
| 2006/0112222 A1 | 5/2006 | Barrall |
| 2006/0167921 A1 | 7/2006 | Grebus et al. |
| 2006/0206901 A1 * | 9/2006 | Chan ...................... G06F 9/524 718/107 |
| 2006/0224918 A1 | 10/2006 | Koike |
| 2006/0225065 A1 | 10/2006 | Chandhok et al. |
| 2006/0253856 A1 * | 11/2006 | Hu .......................... G06F 9/526 718/104 |
| 2006/0271510 A1 | 11/2006 | Harward et al. |
| 2006/0271931 A1 | 11/2006 | Harris et al. |
| 2007/0022129 A1 | 1/2007 | Bahar et al. |
| 2007/0038913 A1 | 2/2007 | Allen et al. |
| 2007/0100905 A1 | 5/2007 | Masters et al. |
| 2007/0171921 A1 | 7/2007 | Wookey et al. |
| 2007/0300220 A1 | 12/2007 | Seliger et al. |
| 2008/0040483 A1 | 2/2008 | Nakatani et al. |
| 2008/0059474 A1 | 3/2008 | Lim |
| 2008/0071804 A1 | 3/2008 | Gunda |
| 2008/0071997 A1 | 3/2008 | Loaiza et al. |
| 2008/0098194 A1 | 4/2008 | Hashimoto et al. |
| 2008/0104349 A1 | 5/2008 | Maruyama et al. |
| 2008/0104589 A1 | 5/2008 | Mccrory et al. |
| 2008/0133486 A1 | 6/2008 | Fitzgerald et al. |
| 2008/0134178 A1 | 6/2008 | Fitzgerald et al. |
| 2008/0189468 A1 | 8/2008 | Schmidt et al. |
| 2008/0195827 A1 | 8/2008 | Saika |
| 2008/0201414 A1 | 8/2008 | Amir et al. |
| 2008/0201457 A1 | 8/2008 | London |
| 2008/0263113 A1 | 10/2008 | Krishnaiyer et al. |
| 2008/0270677 A1 | 10/2008 | Kolakowski |
| 2008/0271017 A1 | 10/2008 | Herington |
| 2008/0320499 A1 | 12/2008 | Suit |
| 2008/0320583 A1 | 12/2008 | Sharma et al. |
| 2009/0006801 A1 | 1/2009 | Shultz et al. |
| 2009/0100248 A1 | 4/2009 | Kami |
| 2009/0150885 A1 | 6/2009 | Safari et al. |
| 2009/0158082 A1 | 6/2009 | Jain et al. |
| 2009/0171971 A1 | 7/2009 | Goddard et al. |
| 2009/0182860 A1 | 7/2009 | Hwang et al. |
| 2009/0193272 A1 | 7/2009 | Matsuzawa et al. |
| 2009/0216975 A1 | 8/2009 | Halperin et al. |
| 2009/0248847 A1 | 10/2009 | Sutoh et al. |
| 2009/0248870 A1 | 10/2009 | Kamel et al. |
| 2009/0249470 A1 | 10/2009 | Litvin et al. |
| 2009/0271412 A1 | 10/2009 | Lacapra et al. |
| 2009/0287887 A1 | 11/2009 | Matsuki et al. |
| 2009/0288084 A1 | 11/2009 | Astete et al. |
| 2010/0023521 A1 | 1/2010 | Arcese et al. |
| 2010/0070725 A1 | 3/2010 | Prahlad et al. |
| 2010/0082716 A1 | 4/2010 | Agetsuma et al. |
| 2010/0082774 A1 | 4/2010 | Pitts |
| 2010/0095289 A1 | 4/2010 | Nguyen et al. |
| 2010/0138921 A1 | 6/2010 | Na et al. |
| 2010/0174745 A1 | 7/2010 | Ryan et al. |
| 2010/0214908 A1 | 8/2010 | Ralev |
| 2010/0241785 A1 | 9/2010 | Chen et al. |
| 2010/0250824 A1 | 9/2010 | Belay |
| 2010/0275205 A1 | 10/2010 | Nakajima |
| 2010/0306256 A1 | 12/2010 | Blackman |
| 2011/0022694 A1 | 1/2011 | Dalal et al. |
| 2011/0022695 A1 | 1/2011 | Dalal et al. |

(56) References Cited

U.S. PATENT DOCUMENTS

| | | |
|---|---|---|
| 2011/0022812 A1 | 1/2011 | van der Linden et al. |
| 2011/0022883 A1 | 1/2011 | Hansen |
| 2011/0047340 A1 | 2/2011 | Olson et al. |
| 2011/0078318 A1 | 3/2011 | Desal et al. |
| 2011/0119668 A1 | 5/2011 | Calder et al. |
| 2011/0119763 A1 | 5/2011 | Wade et al. |
| 2011/0125835 A1 | 5/2011 | Soltis |
| 2011/0137879 A1 | 6/2011 | Dubey et al. |
| 2011/0153561 A1 | 6/2011 | Sawdon et al. |
| 2011/0161299 A1 | 6/2011 | Prahlad et al. |
| 2011/0179414 A1 | 7/2011 | Goggin et al. |
| 2011/0184993 A1 | 7/2011 | Chawla et al. |
| 2011/0185292 A1 | 7/2011 | Chawla et al. |
| 2011/0225574 A1 | 9/2011 | Khalidi et al. |
| 2011/0238949 A1* | 9/2011 | Archer .................. G06F 9/526 712/30 |
| 2011/0239039 A1 | 9/2011 | Dieffenbach et al. |
| 2011/0239213 A1 | 9/2011 | Aswani et al. |
| 2011/0251992 A1 | 10/2011 | Bethlehem et al. |
| 2011/0252208 A1 | 10/2011 | Ali et al. |
| 2011/0255538 A1 | 10/2011 | Srinivasan et al. |
| 2011/0265076 A1 | 10/2011 | Thorat et al. |
| 2011/0271279 A1 | 11/2011 | Pate |
| 2011/0276578 A1 | 11/2011 | Allalouf et al. |
| 2011/0276963 A1 | 11/2011 | Wu et al. |
| 2011/0283277 A1 | 11/2011 | Castillo et al. |
| 2011/0289561 A1 | 11/2011 | Ivanov et al. |
| 2011/0296069 A1* | 12/2011 | Tarta .................. G06F 9/526 710/200 |
| 2011/0307729 A1 | 12/2011 | Matsuzawa et al. |
| 2011/0320690 A1 | 12/2011 | Petersen et al. |
| 2012/0017114 A1 | 1/2012 | Timashev et al. |
| 2012/0023495 A1 | 1/2012 | Machida |
| 2012/0030456 A1 | 2/2012 | Wu et al. |
| 2012/0054736 A1 | 3/2012 | Arcese et al. |
| 2012/0081395 A1 | 4/2012 | Adi et al. |
| 2012/0084381 A1 | 4/2012 | Alladi et al. |
| 2012/0151249 A1 | 6/2012 | Swan et al. |
| 2012/0166866 A1 | 6/2012 | Rao et al. |
| 2012/0185437 A1 | 7/2012 | Pavlov et al. |
| 2012/0209983 A1 | 8/2012 | Bronner et al. |
| 2012/0210066 A1 | 8/2012 | Joshi et al. |
| 2012/0233463 A1 | 9/2012 | Holt et al. |
| 2012/0254445 A1 | 10/2012 | Kawamoto et al. |
| 2012/0254567 A1 | 10/2012 | Umbehocker |
| 2012/0266162 A1 | 10/2012 | Baron |
| 2012/0272237 A1 | 10/2012 | Baron |
| 2012/0290630 A1 | 11/2012 | Aizman et al. |
| 2012/0310881 A1 | 12/2012 | Shadmon |
| 2012/0310892 A1 | 12/2012 | Dam et al. |
| 2012/0324183 A1 | 12/2012 | Chiruvolu et al. |
| 2012/0331119 A1 | 12/2012 | Bose et al. |
| 2013/0046740 A1 | 2/2013 | Li et al. |
| 2013/0047160 A1 | 2/2013 | Conover |
| 2013/0054979 A1 | 2/2013 | Basmov et al. |
| 2013/0055018 A1 | 2/2013 | Joshi et al. |
| 2013/0061110 A1 | 3/2013 | Zvibel |
| 2013/0061167 A1 | 3/2013 | Rhodes et al. |
| 2013/0066930 A1 | 3/2013 | Kamei et al. |
| 2013/0117744 A1 | 5/2013 | Klein et al. |
| 2013/0132674 A1 | 5/2013 | Sundrani |
| 2013/0151888 A1 | 6/2013 | Bhattiprolu et al. |
| 2013/0152085 A1 | 6/2013 | D, Amore et al. |
| 2013/0174165 A1* | 7/2013 | Chopra ............... G06F 11/1482 707/E17.001 |
| 2013/0185716 A1 | 7/2013 | Yin et al. |
| 2013/0198738 A1 | 8/2013 | Reddin et al. |
| 2013/0212345 A1 | 8/2013 | Nakajima |
| 2013/0227379 A1 | 8/2013 | Gupta et al. |
| 2013/0227552 A1 | 8/2013 | Reddin et al. |
| 2013/0227566 A1 | 8/2013 | Higuchi et al. |
| 2013/0232491 A1 | 9/2013 | Radhakrishnan et al. |
| 2013/0246705 A1 | 9/2013 | Diare |
| 2013/0247036 A1 | 9/2013 | Fujiwara |
| 2013/0262396 A1 | 10/2013 | Kripalani et al. |
| 2013/0282994 A1 | 10/2013 | Wires et al. |
| 2013/0283267 A1 | 10/2013 | Cooper et al. |
| 2013/0297869 A1 | 11/2013 | Mills et al. |
| 2014/0006465 A1 | 1/2014 | Davis et al. |
| 2014/0006708 A1 | 1/2014 | Huynh et al. |
| 2014/0025796 A1 | 1/2014 | Vibhor et al. |
| 2014/0059392 A1 | 2/2014 | Ren et al. |
| 2014/0075029 A1 | 3/2014 | Lipchuk et al. |
| 2014/0095544 A1 | 4/2014 | Eshel et al. |
| 2014/0095555 A1 | 4/2014 | Kim et al. |
| 2014/0095816 A1 | 4/2014 | Hsu et al. |
| 2014/0108587 A1 | 4/2014 | Goldberg et al. |
| 2014/0115182 A1 | 4/2014 | Sabaa et al. |
| 2014/0123138 A1 | 5/2014 | Lee et al. |
| 2014/0146055 A1 | 5/2014 | Bala et al. |
| 2014/0149794 A1 | 5/2014 | Shetty et al. |
| 2014/0149983 A1 | 5/2014 | Bonilla et al. |
| 2014/0164449 A1 | 6/2014 | Kim et al. |
| 2014/0173199 A1 | 6/2014 | Gupta et al. |
| 2014/0181048 A1 | 6/2014 | Varadharajan et al. |
| 2014/0181116 A1 | 6/2014 | Wang |
| 2014/0181438 A1 | 6/2014 | Varadharajan et al. |
| 2014/0188808 A1 | 7/2014 | Wolf et al. |
| 2014/0189429 A1 | 7/2014 | Gill et al. |
| 2014/0189677 A1 | 7/2014 | Curzi et al. |
| 2014/0189685 A1 | 7/2014 | Kripalani |
| 2014/0189686 A1 | 7/2014 | Masters et al. |
| 2014/0196038 A1 | 7/2014 | Kottomtharayil et al. |
| 2014/0201725 A1 | 7/2014 | Tian et al. |
| 2014/0207824 A1 | 7/2014 | Brandwine et al. |
| 2014/0230024 A1 | 8/2014 | Uehara et al. |
| 2014/0237464 A1 | 8/2014 | Waterman et al. |
| 2014/0250300 A1 | 9/2014 | Runkis et al. |
| 2014/0279909 A1 | 9/2014 | Sudarsanam et al. |
| 2014/0298185 A1 | 10/2014 | Chen et al. |
| 2014/0310710 A1 | 10/2014 | Lubsey et al. |
| 2014/0359612 A1 | 12/2014 | D'Amato et al. |
| 2014/0365549 A1* | 12/2014 | Jenkins ................. G06F 9/526 709/201 |
| 2015/0006788 A1 | 1/2015 | Liu et al. |
| 2015/0007180 A1 | 1/2015 | Sharp et al. |
| 2015/0026682 A1 | 1/2015 | Singh et al. |
| 2015/0032690 A1 | 1/2015 | Hoque et al. |
| 2015/0039735 A1 | 2/2015 | Zeyliger et al. |
| 2015/0039837 A1 | 2/2015 | Quan et al. |
| 2015/0058475 A1 | 2/2015 | Earl et al. |
| 2015/0074536 A1 | 3/2015 | Varadharajan et al. |
| 2015/0074659 A1 | 3/2015 | Madsen et al. |
| 2015/0081644 A1 | 3/2015 | Pitts |
| 2015/0095597 A1 | 4/2015 | Ayanam et al. |
| 2015/0095788 A1 | 4/2015 | Thiele et al. |
| 2015/0106802 A1 | 4/2015 | Ivanov et al. |
| 2015/0120925 A1* | 4/2015 | Das .................. H04L 67/1097 709/225 |
| 2015/0142745 A1 | 5/2015 | Tekade et al. |
| 2015/0142747 A1 | 5/2015 | Zou |
| 2015/0143164 A1 | 5/2015 | Veerla et al. |
| 2015/0172412 A1 | 6/2015 | Escriva et al. |
| 2015/0178019 A1 | 6/2015 | Hegdal et al. |
| 2015/0186635 A1 | 7/2015 | Nakhjiri et al. |
| 2015/0193144 A1 | 7/2015 | Bilas et al. |
| 2015/0205639 A1 | 7/2015 | Matsumoto et al. |
| 2015/0213032 A1 | 7/2015 | Powell et al. |
| 2015/0220324 A1 | 8/2015 | Arcese et al. |
| 2015/0242291 A1 | 8/2015 | Chang et al. |
| 2015/0248402 A1 | 9/2015 | Patterson, III et al. |
| 2015/0256617 A1 | 9/2015 | Klose et al. |
| 2015/0278046 A1 | 10/2015 | Zellermayer et al. |
| 2015/0293830 A1 | 10/2015 | Bhide et al. |
| 2015/0293896 A1 | 10/2015 | Runkis et al. |
| 2015/0301903 A1 | 10/2015 | Mutha et al. |
| 2015/0309825 A1 | 10/2015 | Farkas et al. |
| 2015/0032653 A1 | 11/2015 | Cui et al. |
| 2015/0324217 A1 | 11/2015 | Shilmover et al. |
| 2015/0326531 A1 | 11/2015 | Cui et al. |
| 2015/0331757 A1 | 11/2015 | Durge et al. |
| 2015/0355862 A1 | 12/2015 | Hayes et al. |
| 2015/0378761 A1 | 12/2015 | Sevigny et al. |
| 2015/0378853 A1 | 12/2015 | Sevigny et al. |

(56) References Cited

U.S. PATENT DOCUMENTS

| | | |
|---|---|---|
| 2016/0011898 A1 | 1/2016 | Lee et al. |
| 2016/0070492 A1 | 3/2016 | Cherubini et al. |
| 2016/0077988 A1 | 3/2016 | Tipton et al. |
| 2016/0078068 A1 | 3/2016 | Agrawal et al. |
| 2016/0085480 A1 | 3/2016 | Chiu et al. |
| 2016/0085574 A1 | 3/2016 | Dornemann et al. |
| 2016/0087861 A1 | 3/2016 | Kuan et al. |
| 2016/0110214 A1 | 4/2016 | Vincent et al. |
| 2016/0110267 A1 | 4/2016 | Earl et al. |
| 2016/0124663 A1 | 5/2016 | Mitkar et al. |
| 2016/0124665 A1 | 5/2016 | Jain et al. |
| 2016/0162371 A1 | 6/2016 | Prabhu et al. |
| 2016/0171241 A1 | 6/2016 | Yun |
| 2016/0179419 A1 | 6/2016 | Yamaguchi et al. |
| 2016/0180107 A1 | 6/2016 | Panchbudhe et al. |
| 2016/0188232 A1 | 6/2016 | Ramachandran et al. |
| 2016/0188407 A1 | 6/2016 | Bronnikov et al. |
| 2016/0202916 A1 | 7/2016 | Cui et al. |
| 2016/0203008 A1 | 7/2016 | Cui et al. |
| 2016/0216993 A1 | 7/2016 | Beckwith et al. |
| 2016/0224363 A1 | 8/2016 | Joy |
| 2016/0274926 A1 | 9/2016 | Narasimhamurthy et al. |
| 2016/0301766 A1 | 10/2016 | Ionescu et al. |
| 2016/0306558 A1 | 10/2016 | Varadharajan et al. |
| 2016/0306751 A1 | 10/2016 | Amarendran et al. |
| 2016/0314046 A1 | 10/2016 | Kumarasamy |
| 2016/0316003 A1 | 10/2016 | Snider et al. |
| 2016/0328007 A1 | 11/2016 | Aranjani et al. |
| 2016/0328226 A1 | 11/2016 | Arya et al. |
| 2016/0335134 A1 | 11/2016 | Gupta et al. |
| 2016/0359697 A1 | 12/2016 | Scheib et al. |
| 2016/0371020 A1 | 12/2016 | Sarkar et al. |
| 2016/0378528 A1 | 12/2016 | Zamir |
| 2016/0378616 A1 | 12/2016 | Wigmore et al. |
| 2017/0004131 A1 | 1/2017 | Ben Dayan et al. |
| 2017/0005990 A1 | 1/2017 | Birger et al. |
| 2017/0012904 A1 | 1/2017 | Matzek et al. |
| 2017/0024152 A1 | 1/2017 | Bhagi et al. |
| 2017/0024224 A1 | 1/2017 | Bakke et al. |
| 2017/0039078 A1 | 2/2017 | Chen et al. |
| 2017/0039082 A1 | 2/2017 | Ganesan et al. |
| 2017/0039218 A1 | 2/2017 | Prahlad et al. |
| 2017/0041296 A1 | 2/2017 | Ford et al. |
| 2017/0048223 A1 | 2/2017 | Anantha Padmanaban et al. |
| 2017/0068469 A1 | 3/2017 | Shankar et al. |
| 2017/0075921 A1 | 3/2017 | Benton et al. |
| 2017/0090776 A1 | 3/2017 | Kowles |
| 2017/0091047 A1 | 3/2017 | Bangalore et al. |
| 2017/0109184 A1 | 4/2017 | Ramani et al. |
| 2017/0123890 A1 | 5/2017 | Haridas et al. |
| 2017/0155691 A1 | 6/2017 | Knauft et al. |
| 2017/0160983 A1 | 6/2017 | Fiske et al. |
| 2017/0177638 A1 | 6/2017 | Bhosale et al. |
| 2017/0193021 A1 | 7/2017 | Deng et al. |
| 2017/0206074 A1 | 7/2017 | Arcese et al. |
| 2017/0206207 A1 | 7/2017 | Bondurant et al. |
| 2017/0220661 A1 | 8/2017 | Cao et al. |
| 2017/0228300 A1 | 8/2017 | Thomas et al. |
| 2017/0235507 A1 | 8/2017 | Sinha et al. |
| 2017/0235562 A1 | 8/2017 | Bafna et al. |
| 2017/0235563 A1 | 8/2017 | Bafna et al. |
| 2017/0235589 A1 | 8/2017 | Gopalapura Venkatesh et al. |
| 2017/0235590 A1 | 8/2017 | Sinha et al. |
| 2017/0235591 A1 | 8/2017 | Kanada et al. |
| 2017/0235653 A1 | 8/2017 | Arikatla et al. |
| 2017/0235654 A1 | 8/2017 | Deshmukh et al. |
| 2017/0235751 A1 | 8/2017 | Gupta et al. |
| 2017/0235758 A1 | 8/2017 | Gopalapura Venkatesh et al. |
| 2017/0235760 A1 | 8/2017 | Sharpe et al. |
| 2017/0235761 A1 | 8/2017 | Bafna et al. |
| 2017/0235762 A1 | 8/2017 | Sharpe et al. |
| 2017/0235763 A1 | 8/2017 | Gopalapura Venkatesh et al. |
| 2017/0235764 A1 | 8/2017 | Sharpe et al. |
| 2017/0235950 A1 | 8/2017 | Gopalapura Venkatesh et al. |
| 2017/0242599 A1 | 8/2017 | Patnaik et al. |
| 2017/0242871 A1 | 8/2017 | Kilaru et al. |
| 2017/0262346 A1 | 9/2017 | Pradhan et al. |
| 2017/0264684 A1 | 9/2017 | Spillane et al. |
| 2017/0277556 A1 | 9/2017 | Ishii et al. |
| 2017/0277903 A1 | 9/2017 | Christodorescu et al. |
| 2017/0279674 A1 | 9/2017 | Zhu |
| 2017/0286228 A1 | 10/2017 | Redko et al. |
| 2017/0302589 A1 | 10/2017 | Leafe et al. |
| 2017/0302731 A1 | 10/2017 | Cui |
| 2018/0004766 A1 | 1/2018 | Darling |
| 2018/0062993 A1 | 3/2018 | Wu et al. |
| 2018/0107838 A1 | 4/2018 | Amarendran et al. |
| 2018/0129426 A1 | 5/2018 | Aron et al. |
| 2018/0143845 A1 | 5/2018 | Chawla et al. |
| 2018/0143880 A1 | 5/2018 | Dornemann |
| 2018/0145960 A1 | 5/2018 | Bakshan et al. |
| 2018/0157521 A1 | 6/2018 | Arikatla et al. |
| 2018/0157522 A1 | 6/2018 | Bafna et al. |
| 2018/0157561 A1 | 6/2018 | Venkatesh et al. |
| 2018/0157677 A1 | 6/2018 | Bafna et al. |
| 2018/0157752 A1 | 6/2018 | Arikatla et al. |
| 2018/0157860 A1 | 6/2018 | Nair et al. |
| 2018/0159729 A1 | 6/2018 | Deshmukh et al. |
| 2018/0159826 A1 | 6/2018 | Yisan et al. |
| 2018/0173731 A1 | 6/2018 | Nazari et al. |
| 2018/0181266 A1 | 6/2018 | Von Muhlen et al. |
| 2018/0181448 A1 | 6/2018 | Von Muhlen et al. |
| 2018/0181449 A1 | 6/2018 | Von Muhlen et al. |
| 2018/0181723 A1 | 6/2018 | Von Muhlen et al. |
| 2018/0196719 A1 | 7/2018 | Glass |
| 2018/0205787 A1 | 7/2018 | Ben Dayan et al. |
| 2018/0225204 A1 | 8/2018 | Choudhari et al. |
| 2018/0278602 A1 | 9/2018 | Koushik et al. |
| 2018/0332105 A1 | 11/2018 | Huang et al. |
| 2018/0181587 A1 | 12/2018 | Von Muhlen et al. |
| 2018/0357251 A1 | 12/2018 | Kumarasamy et al. |
| 2019/0026101 A1 | 1/2019 | Gopalapura Venkatesh et al. |
| 2019/0034240 A1 | 1/2019 | Nabi et al. |
| 2019/0079747 A1 | 3/2019 | Sinha et al. |
| 2019/0087279 A1 | 3/2019 | Kumar et al. |
| 2019/0087280 A1 | 3/2019 | Kumar et al. |
| 2019/0087281 A1 | 3/2019 | Kumar et al. |
| 2019/0087282 A1 | 3/2019 | Kumar et al. |
| 2019/0087285 A1 | 3/2019 | Kumar et al. |
| 2019/0087286 A1 | 3/2019 | Kumar et al. |
| 2019/0129808 A1 | 5/2019 | Acharya et al. |
| 2019/0196718 A1 | 6/2019 | Pai et al. |
| 2019/0207925 A1 | 7/2019 | Anantha Padmanaban et al. |
| 2019/0286330 A1 | 9/2019 | Varadharajan et al. |
| 2019/0332683 A1 | 10/2019 | Thummala et al. |
| 2019/0339883 A1 | 11/2019 | Aron et al. |
| 2020/0007530 A1 | 1/2020 | Mohamad Abdul et al. |
| 2020/0034069 A1 | 1/2020 | Batra et al. |
| 2020/0036647 A1 | 1/2020 | Gupta et al. |
| 2020/0081704 A1 | 3/2020 | Bafna et al. |
| 2020/0081733 A1 | 3/2020 | Buck et al. |
| 2020/0106669 A1 | 4/2020 | Dhillon et al. |
| 2020/0125426 A1 | 4/2020 | Von Muhlen et al. |
| 2020/0125580 A1 | 4/2020 | Shao |
| 2020/0137157 A1 | 4/2020 | Joseph et al. |
| 2020/0274869 A1 | 8/2020 | Tahenakos et al. |
| 2020/0387575 A1 | 12/2020 | Palekar et al. |
| 2021/0081358 A1 | 3/2021 | Khurana et al. |
| 2021/0141630 A1 | 5/2021 | Sharpe et al. |
| 2021/0165759 A1 | 6/2021 | Bar-Nissan et al. |
| 2021/0200641 A1 | 7/2021 | Bafna et al. |
| 2021/0224233 A1 | 7/2021 | Bafna et al. |
| 2021/0247973 A1 | 8/2021 | Gupta et al. |
| 2021/0334178 A1 | 10/2021 | Yang et al. |
| 2021/0344772 A1 | 11/2021 | Arikatla et al. |
| 2021/0349859 A1 | 11/2021 | Bafna et al. |
| 2021/0365257 A1 | 11/2021 | Gopalapura Venkatesh et al. |
| 2021/0382636 A1* | 12/2021 | Perumal ............... G06F 3/0622 |
| 2021/0390080 A1 | 12/2021 | Tripathi et al. |
| 2021/0397587 A1 | 12/2021 | Thummala et al. |
| 2021/0406136 A1 | 12/2021 | Venkatesh et al. |
| 2022/0004377 A1 | 1/2022 | Sharpe et al. |
| 2022/0147342 A1 | 5/2022 | Sharpe et al. |
| 2022/0147495 A1 | 5/2022 | Sharpe et al. |

(56) References Cited

U.S. PATENT DOCUMENTS

| | | | |
|---|---|---|---|
| 2022/0155964 A1 | 5/2022 | Varadharajan et al. |
| 2022/0156107 A1 | 5/2022 | Bafna et al. |
| 2022/0229687 A1 | 7/2022 | Singhal et al. |
| 2022/0350591 A1 | 11/2022 | Bafna et al. |
| 2022/0350592 A1 | 11/2022 | Gopalapura Venkatesh et al. |
| 2023/0185944 A1 | 6/2023 | Nair et al. |
| 2023/0237102 A1 | 7/2023 | Arikatla et al. |
| 2023/0289170 A1 | 9/2023 | Sharpe et al. |
| 2023/0325173 A1 | 10/2023 | Gupta et al. |

FOREIGN PATENT DOCUMENTS

| | | | |
|---|---|---|---|
| CN | 106357744 A | 1/2017 |
| CN | 110516005 A | 11/2019 |
| CN | 110519112 A | 11/2019 |
| CN | 110569269 A | 12/2019 |
| EP | 1062581 B1 | 10/2003 |
| EP | 1214663 B1 | 6/2006 |
| EP | 1979814 A2 | 10/2008 |
| WO | 2010050944 A1 | 5/2010 |
| WO | 2012126177 A2 | 9/2012 |
| WO | 2016018446 A1 | 2/2016 |
| WO | 2018014650 A1 | 1/2018 |

OTHER PUBLICATIONS

U.S. Appl. No. 18/183,142 titled "Virtualized File Server User Views" filed Mar. 13, 2023.
U.S. Appl. No. 18/306,595 titled Self-Healing Virtualized File Server filed Apr. 25, 2023.
"Assign Roles and Permissions using the vSphere Client", Youtube; https://www.youtube.com/watch?v=ZwRheTljapY, Oct. 16, 2018.
"Configure Native File Services on vSAN 7.0!! ", Native File Services on vSAN 7.0; My Cloud Arena Blog; https://mycloudarena.blogspot.com/2020/04/configure-native-file-services-on-vsan.html, Apr. 10, 2020.
"Create a vSAN File Share in vSAN File Service—VMware vSAN 7.0", VMware Arena; https://www.vmwarearena.com/create-a-vsan-file-share/, May 8, 2020.
"Designing and Sizing Virtual SAN Fault Domains", VMware Docs; https://docs.vmware.com/en/VMware-vSphere/6.5/com.vmware.vsphere.virtualsan.doc/GUID-FE7DBC6F-C204-4137-827F-7E04FE88D968.html, May 31, 2019.
"How to Configure vSAN File Service—VMware vSAN 7.0", VMware Arena; https://www.vmwarearena.com/configure-vsan-file-service/, Jul. 27, 2020.
"How to Create a NFS File Share from vSAN Datastore | vSAN 7.0", Youtube; https://www.youtube.com/watch?v=Qrl_XKTv808&t=445s, Jul. 27, 2020.
"How to Create a NFS File Share from vSAN Datastore | vSAN 7.0", Youtube; https://youtu.be/i7fj4IHWwv8, Jul. 27, 2020.
"Local Storage", VMware Docs; https://docs.vmware.com/en/VMware-vSphere/7.0/com.vmware.vsphere.storage.doc/GUID-5F08F7A7-6D8E-45A6-B408-278B3A4C7D4C.html, May 31, 2019.
"Managing Your Data on vSAN with SPBM", VMware Blog; https://blogs.vmware.com/virtualblocks/2018/11/30/managing-your-data-on-vsan-with-spbm/, Nov. 30, 2018.
"Stretched Cluster SPBM Policies—What are my options?", VMware; The Cloud Platform Tech Zone; https://core.vmware.com/blog/stretched-cluster-spbm-policies-what-are-my-options, Jun. 14, 2021.
"Virtual Machine Backup Guide", ESX Server 3.0 and VirtualCenter 2.0; VMware; https://www.vmware.com/pdf/vi3_30_20_vm_backup.pdf, 2006.
"Virtual Machine Files", VMware Docs; https://docs.vmware.com/en/VMware-vSphere/7.0/com.vmware.vsphere.vm_admin.doc/GUID-CEFF6D89-8C19-4143-8C26-4B6D6734D2CB.html, Jul. 16, 2021.
"VMWare High Availability & Data Recovery Configuration Guide v1", IBM; https://www.ibm.com/support/pages/vmware-high-availability-data-recovery-configuration-guide-v1, Nov. 2015.
"VMware vSAN Beta Native Data Protection Feature with NextGen Snapshots", https://www.virtualizationhowto.com/2018/11/vmware-vsan-beta-native-data-protection-feature-with-nextgen-snapshots/, Nov. 7, 2018.
"VSAN 2-Node Cluster Guide", VMwareStorage; https://web.archive.org/web/20221127090148/https://core.vmware.com/resource/vsan-2-node-cluster-guide; dated Jun. 2020; printed Nov. 21, 2022, Jun. 2020.
"VSAN 7 U1 File Services", VMware Virtual Blocks Blog; https://blogs.vmware.com/virtualblocks/2020/09/17/vsan-7-u1-file-services/, Sep. 17, 2020.
"VSAN 7 U1 File Services", Youtube; https://www.youtube.com/watch?v=UvSpiDqh3Bk, Sep. 17, 2020.
"VSAN 7.0 U2 Proof of Concept Guide", VMwareStorage; https://core.vmware.com/resource/vsan-70-u2-proof-concept-guide, Apr. 2021, 1-259.
"VSAN Disaster Recovery", VMware; The Cloud Platform Tech Zone; https://core.vmware.com/resource/vsan-disaster-recovery, Aug. 2020.
"VSAN File Services", VMwareStorage; https://core.vmware.com/resource/vsan-file-services, May 2020.
"VSAN File Services in a Stretched vSAN 7.0 U2 cluster", Youtube; https://www.youtube.com/watch?v=g16uR3110SU, Mar. 25, 2021.
"VSAN File Services Tech Note", VMware; https://cdn-prod.scdn6.secure.raxcdn.com/static/media/8e656fe9-d4d2-4974-91df-2accc2abb7fd.pdf, May 26, 2020.
"VSAN File Services with vCloud Director", Tom Fojta's Blog; https://fojta.wordpress.com/2020/04/06/vsan-file-services-with-vcloud-director/, Apr. 6, 2020.
"VSAN File Services: Seeing an imbalance between protocol stack containers and FS VMs", https://www.yellow-bricks.com/2020/04/22/vsan-file-services-seeing-an-imbalance-between-protocol-stack-containers-and-fs-vms/, Apr. 22, 2020.
"VSAN Health Service—Cluster Health—vSAN Health service installation (2109874)", https://kb.vmware.com/s/article/2109874, Jun. 3, 2021.
"VSAN Health Service—File Service—File Server Health (77165)", VMware Knowledge Base; https://kb.vmware.com/s/article/77165, Feb. 24, 2023.
"VSan NFSv3 v NFSv4 balancing", Youtube; https://www.youtube.com/watch?v=3jWkgfhcg6M&t=3s, Mar. 18, 2020.
"VSan Specialist: Stretched Clusters & Two-Node Clusters—Part 1", vCallaway; http://vcallaway.com/vsan-specialist-stretched-clusters-two-node-clusters/, Sep. 26, 2017.
"VSphere Replication enhancements in vSAN 7.0", YouTube; https://www.youtube.com/watch?v=cjZUkxrYW1M; screen capture at 1:45, Mar. 2020.
"VSphere Replication Target Storage Consumption", VMware vSphere Blog; https://blogs.vmware.com/vsphere/2015/04/vsphere-replication-target-storage-consumption.html, Apr. 17, 2015.
"VSphere Replication Technical Overview", VMwareBC/DR; https://core.vmware.com/resource/vsphere-replication-technical-overview, Aug. 2020.
Cormac , "vSAN File Service & Kubernetes PVs with an implicit quota", https://cormachogan.com/2021/07/08/vsan-file-service-kubernetes-pvs-with-an-implicit-quota/, Jun. 8, 2021.
Epping , "vSAN File Services and Stretched Clusters!", Yellow Bricks blog; https://www.yellow-bricks.com/2021/03/29/vsan-file-services-and-stretched-clusters/, Mar. 29, 2021.
Flecha , "Understanding vSAN Architecture: Disk Groups", VMware Virtual Blocks Blog; https://blogs.vmware.com/virtualblocks/2019/04/18/vsan-disk-groups/, Apr. 18, 2019.
Flecha , "vSAN 7 Update 2 File Services", VMware Virtual Blocks Blog; https://blogs.vmware.com/virtualblocks/2021/03/17/vsan-7-update-2-file-services/, Mar. 17, 2021.
U.S. Appl. No. 18/054,490 titled "Virtualized File Server Distribution Across Clusters" filed Nov. 10, 2022.
U.S. Appl. No. 18/069,920 titled "Transparent Referrals for Distributed File Servers" filed Dec. 21, 2022.
"Nutanix Files Guide"; Nutanix; Sep. 14, 2018; pp. all.
"Setting up and Using Acropolis File Services (AFS) on Nutanix AOS 5.0"; Virtual Dennis—Sharing Technical Tips Learned the Hard Way; Posted Dec. 30, 2016; pp. all.

(56) References Cited

OTHER PUBLICATIONS

U.S. Appl. No. 17/129,425, titled "Parallel Change File Tracking in a Distributed File Server Virtual Machine (FSVM) Architecture", filed Dec. 21, 2020; pp. all.
Bas van Kaam "New in AOS 5.0: Nutanix Acropolis File Services"; basvankaam.com; Jan. 5, 2017; pp. all.
Cano, Ignacio et al. "Curator: Self-Managing Storage for Enterprise Clusters"; University of Washington; published Mar. 2017; pp. all.
Dell: "High Availability and Data Protection With Dell EMC Isilon Scale-Out NAS"; Jul. 2019, Dell Inc., pp. all.
Jay Bounds "High-Availability (HA) Pair Controller Configuration Overview and Best Practices"; NetApp; Feb. 2016; pp. all.
Jorge Costa "High Availability Setup Using Veritas Cluster Server and NetApp Synchronous SnapMirror—One button Failover/Failback with SnapMirror Sync and Veritas Cluster Server"; NetApp Community: Nov. 18, 2010; pp. all.
NetApp "Preparing Storage Systems for Snapmirror Replication"; Apr. 2005, NetApp, Inc., pp. all.
NetApp: "Clustered Data Ontap 8.2 File Access Management Guide for CIFS"; Feb. 2014 (year 2014); pp. all.
Poitras, Steven. "The Nutanix Bible" (Sep. 1, 2020), from https://nutanixbible.com/; pp. all.
Poitras, Steven. "The Nutanix Bible" (Sep. 17, 2019), from https://nutanixbible.com/ pp. all.
Poitras, Steven. "The Nutanix Bible" (Jul. 25, 2019), from https:/nutanixbible.com/ pp. all.
Ruth, Paul "Autonomic Live Adaption of Virtual Computational Environments in a Multi-Domain Infrastructure"; 2006 IEEE International Conference on Autonomic Computing, 2006, pp. 5-14.
U.S. Appl. No. 17/180,257 titled "Virtualized File Server User Views" filed Feb. 19, 2021, pp. all.
U.S. Appl. No. 17/169,137 titled "Virtualized File Server Data Sharing" filed Feb. 5, 2021, pp. all.
U.S. Appl. No. 17/238,001 titled "Cloning Virtualized File Servers" filed Apr. 22, 2021, pp. all.
U.S. Appl. No. 17/302,343 titled "Disaster Recovery for Distributed File Servers, Including Metadata Fixers" filed Apr. 30, 2021, pp. all.
U.S. Appl. No. 17/364,453 titled "Virtualized Server Systems and Methods Including Domain Joining Techniques" filed Jun. 30, 2021, pp. all.
U.S. Appl. No. 15/829,602 entitled "Handling Permissions for Virtualized File Servers", filed Dec. 1, 2017, pp. all.
U.S. Appl. No. 15/966,943 titled "Virtualized Server Systems and Methods Including Domain Joining Techniques" filed Apr. 30, 2018, pp. all.
U.S. Appl. No. 16/687,327, titled "Virtualized File Server Rolling Upgrade", filed Nov. 19, 2019, pp. all.
U.S. Appl. No. 16/144,637, titled "Computing Node Clusters Supporting Network Segmentation", filed Sep. 27, 2018, pp. all.
U.S. Appl. No. 17/091,758 titled "Virtualized File Server Distribution Across Clusters", filed Nov. 6, 2020, pp. all.
Dell EMC; Dell EMC Isilon OneFS Operating System; Scale-out NAS to maximize the data capital and business value of your unstructured data; 2020, pp. all.
Dell EMC; White Paper; Dell EMC Isilon OneFs Operating System; Powering the Isilon Scale-Out Storage Platform; Dec. 2019, pp. all.
Emc Isilon OneFS Operating System; Powering scale-out storage for the new world of Big Data in the enterprise; www.EMC.com; captured Feb. 2020, pp. all.
Isilon OneFS, Version 8.0.1; Web Administration Guide; Published Oct. 2016, pp. all.
U.S. Appl. No. 15/833,255, entitled "Cloning Virtualized File Servers", filed Dec. 6, 2017, pp. all.
U.S. Appl. No. 15/833,391, entitled "Virtualized Server Systems and Methods Including Scaling of File System Virtual Machines", filed Dec. 6, 2017, pp. all.
U.S. Appl. No. 15/422,220, entitled "Virtualized File Server" filed Feb. 1, 2017, pp. all.
U.S. Appl. No. 15/829,340, entitled "Configuring Network Segmentation for a Virtualization Environment", filed Dec. 1, 2017, pp. all.
U.S. Appl. No. 15/829,731, entitled "Transparent Referrals for Distributed File Servers", filed Dec. 1, 2017, pp. all.
U.S. Appl. No. 15/829,781, entitled "Virtualized Server Systems and Methods Including Load Balancing for Virtualized File Servers", filed Dec. 1, 2017, pp. all.
U.S. Appl. No. 15/832,310 entitled "Disaster Recovery for Distributed File Servers, Including Metadata Fixers", filed Dec. 5, 2017, pp. all.
U.S. Appl. No. 16/140,250 titled "Virtualized File Server Data Sharing" filed Sep. 24, 2018, pp. all.
U.S. Appl. No. 16/160,618 titled "Virtualized File Server Backup to Cloud" filed Oct. 15, 2018, pp. all.
U.S. Appl. No. 16/942,929 titled "Method Using Access Information in a Distributed File Server Virtual Machine (FSVM) Architecture, Including Web Access"; filed Jul. 30, 2020, pp. all.
U.S. Appl. No. 16/944,323 titled "Actions Based on File Tagging in a Distributed File Server Virtual Machine (FSVM) Environment", filed Jul. 31, 2020, pp. all.
"Administering VMware vSAN—VMware vSphere 7.0", 2015-2020, pp. 1-114.
"Backup vSAN 7 File Share with Veeam Backup & Replication 10", Sysadmin Stories, https://www.sysadminstories.com/2020/06/backup-vsan-7-file-share-with-veeam.html, Jun. 2, 2020, pp. 1-7.
"Characteristics of a vSAN Cluster", May 31, 2019, pp. 1-2.
"Enabling or disabling SMB automatic node referrals", NetApp https://docs.netapp.com/ontap-9/index.jsp?topic=%2Fcom.netapp.doc.cdot-famg-cifs%2FGUID-AC7E8515-3A4C-4BB5-A8C8-38B565C952E0.html, Captured Sep. 19, 2019, pp. all.
"Guaranteeing throughput with QoS", NetApp https://docs.netapp.com/ontap-9/index.jsp?topic=%2Fcom.netapp.doc.pow-perf-mon%2FGUID-77DF9BAF-4ED7-43F6-AECE-95DFB0680D2F.html, Captured Sep. 19, 2019, pp. all.
"How to troubleshoot the 'Autolocation' feature in Clustered Data ONTAP", NetApp https://kb.netapp.com/app/answers/answer_view/a_id/1030857/loc/en_US#_highlight, Captured Sep. 19, 2019, pp. all.
"How to Troubleshoot the 'Autolocation' feature in Clustered Data ONTAP—Results", NetApp https://kb.netapp.com/app/results/kw/autolocation/, Captured Sep. 19, 2019, pp. all.
"Hybrid Cloud Storage with Cloudian HyperStore and Amazon S3", Cloudian Inc.; www.cloudian.com, 2014, pp. all.
"Improving client response time by providing SMB automatic node referrals with Auto Location", NetApp https://library.netapp.com/ecmdocs/ECMP1196891/html/GUID-0A5772A4-A6D7-4A00-AC2A-92B868C5B3B5.html, Captured Sep. 19, 2019, pp. all.
"Managing Workloads", NetApp https://docs.netapp.com/ontap-9/index.jsp?topic=%2Fcom.netapp.doc.pow-perf-mon%2FGUID-13D35FC5-AF37-4BBD-8A8E-B10841451A16.html, captured Sep. 19, 2019, pp. all.
"Nutanix AFS—Introduction & Steps For Setting Up", Retrieved from https ://virtual building blocks. com/2 0 1 8/01 /03/nutanix-afs-introduction-steps-for-setting-up/ (Year: 2018), Jan. 3, 2018, pp. 1-23.
"Protect Your Data With Netapp Element Software", Solution Brief; NetApp, 2018, pp. all.
"Tech TopX: AHV One Click Upgrade", Screen captures from YouTube video clip entitled "Tech TopX: AHV One Click Upgrade," 13 pages, uploaded on Dec. 8, 2015 by user "Nutanix University". Retrieved from Internet: https://www.youtube.com/watch?v=3dALdzw6qZM, Dec. 8, 2015, pp. all.
"Virtual Disk Manager User's Guide: Virtual Disk Development Kit", vmware.com, 2008, pp. 1-12.
"VSAN File Services Tech Note | VMware", 2021, pp. 1-7.
"VSAN Monitoring and Troubleshooting—VMware vSphere 7.0", https://docs.vmware.com/, 2018, pp. 1-61.
"VSAN Performance Graphs in the vSphere Web Client (2144493)", Nov. 9, 2020, pp. 1-42.
"VSphere Availability—VMware vSphere 6.7", https://docs.vmware.com/, Jan. 11, 2019, pp. 1-105.

(56) References Cited

OTHER PUBLICATIONS

"VSphere Storage—VMware vSphere 6.7", https://docs.vmware.com/, Jan. 4, 2021, pp. 1-382.
Bhardwaj, Rishi, "The Wonderful World of Distributed Systems and the Art of Metadata Management", Nutanix, Inc. https://www.nutanix.com/blog/the-wonderful-world-of-distributed-systems-and-metdata-management pp. 1-8.
Birk, Ryan "How it Works: Understanding vSAN Architecture Components", altaro.com, Feb. 28, 2018, pp. 1-10.
Cormac "Native File Services for vSAN 7", CormacHogan.com, Mar. 11, 2020, pp. 1-23.
Feroce, Danilo "Leveraging VMware vSAM for Highly Available Management Clusters", VMware, Inc., Version 2.9, VMware, Inc., Jan. 2018, 1pp.-22.
Fojta, Tomas, "Quotas and Quota Policies in VMware Cloud Director—Tom Fojta's Blog", Nov. 6, 2020, pp. 1-4.
Fojta, Tomas vSAN Flle Services with vCloud Director—Tom Fojta's Blog, (wordpress.com) ("Fojta Blog"). 1-8.
Hogan, Cormac "New updates from Nutanix—NOS 3.0 and NX-3000", https://cormachogan.com/2012/12/20/new-from-nutanix-nos-3-0-nx-3000/, Dec. 20, 2012, pp. 1-7.
Kemp, Erik "NetApp SolidFire SnapMirror Architecture and Configuration", Technical Report, NetApp, Dec. 2017, pp. all.
Kleyman, Bill "How Cloud Computing Changes Storage Tiering", https://www.datacenterknowledge.com, captured Jun. 4, 2019, Nov. 12, 2015, pp. all.
Leibovici, Andre "Nutanix One-Click Upgrade now takes care of Firmware and Hypervisor too!", myvirtualcloud.net https://myvirtualcloud.net/nutanix-one-click-upgrade-now-takes-care-of-firmware-and-hypervisor-too/ Jul. 31, 2014, pp. 1-4.
Poitras, Steven. "The Nutanix Bible" (Mar. 2, 2020), from hhttps://nutanixbible.com/, pp. all.
Poitras, Steven. "The Nutanix Bible" (Jan. 11, 2014), from http:/stevenpoitras.com/the-nutanix-bible/ (Publication date based on indicated capture date by Archive.org; first publication date unknown), pp. all.
Poitras, Steven. "The Nutanix Bible" (Jan. 12, 2016), from https://nutanixbible.com/, pp. all.
Poitras, Steven. "The Nutanix Bible" (Oct. 15, 2013), from http://stevenpoitras.com/the-nutanix-bible/ (Publication date based on indicated capture date by Archive.org; first publication date unknown), pp. all.
Poitras, Steven. "The Nutanix Bible" (Jun. 20, 2014), from http://stevenpoitras.com/the-nutanix-bible/ (Publication date based on indicated capture date by Archive.org; first publication date unknown), pp. all.
Poitras, Steven. "The Nutanix Bible" (Jun. 25, 2018), from https://nutanixbible.com/, pp. all.
Poitras, Steven. "The Nutanix Bible" (Jan. 3, 2017), from https:/nutanixbible.com/, pp. all.
Poitras, Steven. "The Nutanix Bible" (Jan. 3, 2018), from https://nutanixbible.com/, pp. all.
Poitras, Steven. "The Nutanix Bible" (Sep. 4, 2015), from https://nutanixbible.com/, pp. all.
Poitras, Steven. "The Nutanix Bible" (Jan. 7, 2015), from http://stevenpoitras.com/the-nutanix-bible/ (Publication date based on indicated capture date by Archive.org; first publication date unknown), pp. all.
Poitras, Steven. "The Nutanix Bible" (Jan. 8, 2019), from https://nutanixbible.com/, pp. all.
Poitras, Steven. "The Nutanix Bible" (Jun. 8, 2017), from https://nutanixbible.com/, pp. all.
Poitras, Steven. "The Nutanix Bible" (Jun. 9, 2015), from http://stevenpoitras.com/the-nutanix-bible/ (Publication date based on indicated capture date by Archive.org; first publication date unknown), pp. all.
Poitras, Steven. "The Nutanix Bible" (Jun. 9, 2016), from https://nutanixbible.com/, pp. all.
Seget, Vladan "VMware vSAN 7 now with native file services and quotas", May 1, 2020, pp. all.
Seget, Vladan "VMware vSphere 7.0 and vSAN storage improvements", Apr. 1, 2020, pp. 1-12.
Sturniolo, Andy "VMware vSAN File Services and Veeam", Veeam Blog, https://www.veeam.com/blog/veeam-backup-vsan-file-services.html, Jul. 22, 2020, pp. 1-9.
Young-Woo, J. et al., "Standard-based Virtual Infrastructure Resource Management for Distributed and Heterogeneous Servers", ICACT, Feb. 15, 2009, pp. all.
Poitras, Steven. "The Nutanix Bible" (Mar. 2, 2021), from https://nutanixbible.com/; pp. all.
U.S. Appl. No. 17/448,315 titled "Virtualized File Server" filed Sep. 21, 2021, pp. all.
VMware vSphere VMFS "Technical Overview and Best Practices", a VMware Technical White Paper updated for VMware vSphere 5.1, Version 3.0; Nov. 27, 2012, pp. all.
"Designing and Sizing Virtual SAN Fault Domains", Administering VMware Virtual SAN; VMware vSphere 6.5; vSAN 6.6; https://docs.vmware.com/en/VMware-vSphere/6.5/virtual-san-66-administration-guide.pdf, captured Aug. 20, 2021, 2017, pp. 34.
"Path Failover and Virtual Machines", vSphere Storage; Update 2; VMware vSphere 7.0; VMware ESXi 7.0; vCenter Server 7.0; https://docs.vmware.com/en/VMware-vSphere/7.0/vsphere-esxi-vcenter-server-702-storage-guide.pdf, Jun. 25, 2021, pp. 238.
"Understanding Multipathing and Failover", vSphere Storage; VMware vSphere 7.0; VMware ESXi 7.0; vCenter Server 7.0, https://docs.vmware.com/en/VMware-vSphere/7.0/vsphere-esxi-vcenter-server-702-storage-guide.pdf, Jun. 25, 2021, pp. 234-268.
"VMware vCenter Server: Centrally Mananged Virtual Infrastructure Delivered with Confidence", VMWare Datasheet; https://www.vmware.com/content/dam/digitalmarketing/vmware/en/pdf/products/vCenter/vmware-vcenter-server-datasheet.pdf, captured Aug. 20, 2021, 2015, pp. 1-2.
"VMware VSAN 7.0 Release Notes", VMware; https://docs.vmware.com/en/VMware-vSphere/7.0/m/vmware-vsan-70-release-notes.html, Mar. 8, 2021, pp. 1-12.
"VSAN 7.0 U2 Proof of Concept Guide", VMwareStorage; https://images.core.vmware.com/sites/default/files/resource/vsan_70_u2_proof_of_concept_guide_noindex.pdf, printed May 18, 2021, Apr. 2021, pp. 1-267.
"VSAN Health Service—File Service—File Server Health (77165)", VMware, Knowledge Base; https://kb.vmware.com/s/article/77165, May 15, 2021, pp. 1-5.
"VSan Planning and Deployment", Update 2 VMWare vSphere 6.7; VMware vSAN 6.7; https://docs.vmware.com/en/VMware-vSphere/6.7/vsan-673-planning-deployment-guide.pdf, Aug. 20, 2019, pp. 1-85.
"VSan Stretched Cluster Guide", VMwareStorage; https://images.core.vmware.com/sites/default/files/resource/vsan_stretched_cluster_guide_noindex.pdf, printed Jun. 24, 2021, Jun. 2020, pp. 1-62.
Rajendran, Cedric "Working with vSAN Health Checks", VMware vSan Virtual Blocks Blog; https://blogs.vmware.com/virtualblocks/2019/07/18/working-with-vsan-health-checks/, Jul. 18, 2019, pp. 1-6.
Bhardwaj, Rishi; "The Wonderful World of Distributed Systems and the Art of Metadata Management"; Nutanix, Inc., https://www.nutanix.com/blog/the-wonderful-world-of-distributed-systems-and-metadata-management; captured Aug. 19, 2021, published Sep. 24, 2015; pp. all.
U.S. Appl. No. 17/865,907 titled "Virtualized File Server Deployment" filed Jul. 15, 2022.
U.S. Appl. No. 17/866,225 titled Virtualized File Server Disaster Recovery filed Jul. 15, 2022.
"Citrix XenDesktop 7.1 on Microsoft Hyper-V Server 2012 R2 on Nutanix Virtual Computing Platform", Citrix APAC Solutions, Jun. 25, 2014, pp. 1-94.
Jeffrey, Hemmes, et al., "Cacheable Decentralized Groups for Grid Resource Access Control", 2006 7th IEEE/ACM International Conference on Grid Computing Department of Computer Science and Engineering, University of Notre Dame, Sep. 2006, pp. 192-199.
Lye, Ben, "Implementing Windows Server 2008 FileSystem Quotas", Nov. 19, 2009, pp. 1-17.
U.S. Appl. No. 17/580,555 titled "Virtualized File Server" filed Jan. 20, 2022.

(56) References Cited

OTHER PUBLICATIONS

U.S. Appl. No. 17/581,418 titled "File Server Managers and Systems for Managing Virtualized File Servers" filed Jan. 21, 2022.
U.S. Appl. No. 17/585,403 titled "Virtualized File Server Smart Data Ingestion" filed Jan. 27, 2022.
U.S. Appl. No. 17/648,796 titled "Virtualized Server Systems and Methods Including Scaling of File System Virtual Machines" filed Jan. 24, 2022.
Poitras, Steven , "The Nutanix Bible", https://nutanixbible.com/, Apr. 9, 2019, pp. all.
Poitras, Steven , "The Nutanix Bible", https://nutanixbible.com/, Mar. 2, 2021, pp. all.
""Eam-snapshot" snapshot on Service VMs (2150695)", VMWare Customer Connect; retrieved from: https://kb.vmware.com/s/article/2150695, Jan. 17, 2018.
"Administering VMware vSAN", Update 2, VMware vSphere 7.0, VMware vSAN 7.0; https://docs.vmware.com/en/VMware-vSphere/7.0/vsan-702-administration-guide.pdf, Apr. 16, 2021.
"Architecting VMware vSAN 6.2 for VMware Cloud Providers", VMware vCloud Architecture Toolkit; retrieved: https://download3.vmware.com/vcat/vmw-vcloud-architecture-toolkit-spv1-webworks/index.html#page/Storage%20and%20Availability/Architecting%20VMware%20vSAN%206.2/Architecting%20Virtual%20SAN%206.2.2.010.html, Jan. 2018.
"Backing up vSAN File Shares", VMware—The Cloud Platform Tech Zone; retrieved from: https://core.vmware.com/blog/backing-vsan-file-shares, Jun. 18, 2021.
"Copy-on-write and Redirect-on-write", Mohan Kumar Blog; retrieved from: https://mohankumar-k.blogspot.com/2018/05/copy-on-write-and-redirect-on-write.html, May 31, 2018.
"Create a Library", VMWare Docs; retrieved from: https://docs.vmware.com/en/VMware-vSphere/6.5/com.vmware.vsphere.vm_admin.doc/GUID-2A0F1C13-7336-45CE-B211-610D39A6E1F4.html, Jul. 22, 2019.
"Creating and Using Content Library", VMware vSphere Blog; retrieved from: https://blogs.vmware.com/vsphere/2020/01/creating-and-using-content-library.html, Jan. 22, 2020.
"How to configure vSphere 7 Content Library", 4sysops—The online community for SysAdmins and DevOps; retrieved from: https://4sysops.com/archives/how-to-configure-vsphere-7-content-library/, Mar. 19, 2021.
"How to Efficiently Deploy Virtual Machines from VMware vSphere Content Library", VMware VROOM! Performance Blog; retrieved from: https://blogs.vmware.com/performance/2015/07/efficiently-deploy-vms-vmware-vsphere-content- library.html, Jul. 9, 2015.
"Managing Content Library Subscriptions", VMware vSphere Blog; retrieved from: https://blogs.vmware.com/vsphere/2020/02/managing-content-library-subscriptions.html, Feb. 4, 2020.
"New VMware Icons Visio Stencil Download", VM Today; obtained from: https://web.archive.org/web/20230130190532/https://vmtoday.com/2012/09/new-vmware-icons-visio-stencil-download/, Sep. 16, 2012.
"Open Virtualization Format White Paper", DMTF Informational, Version 2.0.0; Distributed Management Task Force, Inc. (DMTF); obtained from https://www.dmtf.org/sites/default/files/standards/documents/DSP2017_2.0.0.pdf, Apr. 14, 2014.
"Rebalance Workload on vSAN File Service Hosts", VMWare Docs; retrieved from: https://docs.vmware.com/en/VMware-vSphere/7.0/com.vmware.vsphere.vsan.doc/GUID-6D9184A4-23BB-411B-983B-D2A9BC6A33E6.html, Jul. 21, 2020.
"The Evolution of Content Library", VMware vSphere Blog; retrieved from: https://blogs.vmware.com/vsphere/2019/12/the-evolution-of-content-library.html, Dec. 3, 2019.
"Understanding Clones in VMware vSphere 7", Performance Study; VMWare; retrieved from: https://www.vmware.com/content/dam/digitalmarketing/vmware/en/pdf/techpaper/performance/cloning-vSphere7-perf.pdf, May 27, 2021.

"Upgrade File Service", VMWare Docs; obtained from https://docs.vmware.com/en/VMware-vSphere/7.0/com.vmware.vsphere.vsan.doc/GUID-184C4D32-216E-4504-A873-5CCC627C115E.html, Feb. 2, 2021.
"Using Linked Clones", VMWare Docs; retrieved: https://docs.vmware.com/en/VMware-Fusion/13/com.vmware.fusion.using.doc/GUID-96D07E71-FF5D-4E82-A5BD-0B15586432E4.html, May 31, 2019.
"VMWare Clones", MacStadium; retrieved: https://docs.macstadium.com/docs/linked-vs-instant-clones, Jun. 2020.
"VMware Snapshots CoW or ROW?", Reddit.com; retrieved from: https://www.reddit.com/r/sysadmin/comments/latbt3/vmware_snapshots_cow_or_row/, Feb. 2, 2021.
"VMware vSphere: Handy tips on working with Content Libraries", StarWind blog; retrieved from: https://www.starwindsoftware.com/blog/working-with-content-libraries-in-vsphere-6-5, Jul. 18, 2018.
"VSAN File Services and the different communication layers", Yellowbricks.com blog; retrieved from: https://www.yellow-bricks.com/2020/04/21/vsan-file-services-communication-layers/, Apr. 21, 2020.
"VSAN File Services considerations", Yellow-Brick.com blog; retrieved from: https://www.yellow-bricks.com/2020/04/15/vsan-file-services-considerations, Apr. 15, 2020.
"VSAN Networking Terms and Definitions", VMWare Docs; retrieved from: https://docs.vmware.com/en/VMware-vSphere/7.0/vsan-network-design-guide/GUID-725668B0-B1B9-48A0-AB4F-A6386C7D649E.html, Dec. 10, 2019.
"VSAN Scalable File Services", It Should Just Work; retrieved from: https://www.isjw.uk/post/events/vmworld-2018/vsan-scalable-file-services/, Nov. 22, 2018.
"VSphere 7 Content libraries—Part 1: Concept and creating a library?", Virtual Maestro blog; https://blogs.virtualmaestro.in/2020/04/29/vsphere-7-content-libraries-part-1-how-do-they-work, Apr. 2020.
"VSphere ESX Agent Manager", VMWare Docs; retrieved from: https://docs.vmware.com/en/VMware-vSphere/7.0/com.vmware.vsphere.monitoring.doc/GUID-D56ABFF4-4529-409C-9AA2-8D8D4E235601.html, Aug. 22, 2020.
"VSphere ESX Agent Manager API Reference Documentation", VMware.com; vSphere ESX Agent Manager API | Version 7.0; obtained from: https://vdc-download.vmware.com/vmwb-repository/dcr-public/6bcc7a1f-e8e0-4cfb-a558-40147eac92f8/11fdf031-6e51-4b38-9768-3b9dace19188/doc/index.html, 2020.
U.S. Appl. No. 18/450,319 titled "Disaster Recovery for Distributed File Servers, Including Metadata Fixers" filed Aug. 15, 2023.
U.S. Appl. No. 18/497,919 titled "Virtualized Server Systems and Methods Including Scaling of File System Virtual Machines" filed Oct. 30, 2023.
U.S. Appl. No. 18/393,105 titled "Virtualized File Server Smart Data Ingestion" filed Dec. 21, 2023.
"3.2.4.1Data Integrity (Software Checksum)", VMWare; retrieved from: https://download3.vmware.com/vcat/vmw-vcloud-architecture-toolkit-spv1-webworks/index.html#page/Storage%20and%20Availability/Architecting%20VMware%20vSAN%206.2/Architecting%20Virtual%20SAN%206.2.2.023.html, Jun. 2018.
"Backup Using vSAN File Share Snapshots", YouTube; retrieved from: https://www.youtube.com/watch?v=06Tr8f0LTZY, Jun. 22, 2021.
"Changing the ESXi Host Name using vSphere Web Client", Pavanas Blog; retrieved from: https://pchawda.wordpress.com/category/esxi/page/3/, May 11, 2016.
"Creating and Managing Protection Groups", VMWare Docs; retrieved from: https://docs.vmware.com/en/Site-Recovery-Manager/8.5/com.vmware.srm.admin.doc/GUID-294475D7-B136-4492-8F8E-522B8EDA26EA.html, Mar. 31, 2020.
"Data Object—VsanFileServiceDomainConfig(vim.vsan.FileServiceDomainConfig)", VMWare; retrieved from: https://vdc-download.vmware.com/vmwb-repository/dcr-public/90ec343b-df7c-493e-9979-36ea55765102/8753fd1e-fcab-4bd4-9cde-a364851f31a6/vim.vsan.FileServiceDomainConfig.html, Mar. 15, 2021.
"Data Placement Optimizations in vSAN 6.7", VMWare Virtual Blocks Blog; retrieved from https://blogs.vmware.com/virtualblocks/2018/07/09/data-placement-optimizations-in-vsan-6-7/, Jul. 9, 2018.

(56) References Cited

OTHER PUBLICATIONS

"Data Protection and Backup Architecture", VMWare Docs; retrieved from: https://docs.vmware.com/en/VMware-Validated-Design/5.1/sddc-architecture-and-design/GUID-69105DDF-AC6D-4787-8E2E-6D887AFDDB9A.html, Jul. 30, 2019.

"Data Protection for VMware vSAN", VMwareStorage; retrieved from https://core.vmware.com/resource/data-protection-vmware-vsan, Aug. 2020.

"Export an OVF Template", VMWare Docs; retrieved from: https://docs.vmware.com/en/VMware-vSphere/7.0/com.vmware.vsphere.vm_admin.doc/GUID-B05A4E9F-DD21-4397-95A1-00125AFDA9C8.html, Feb. 10, 2021.

"File system ACL", IBM; retrieved from: https://www.ibm.com/docs/en/spectrum-scale/4.2.2?topic=STXKQY_4.2.2/com.ibm.spectrum.scale.v4r22.doc/bl1hlp_accessfilesystemacl.html, Mar. 2, 2021.

"How to Configure vSAN File Services in vSAN 7.0 | What's new with vSAN 7.0", YouTube; retrieved from: https://www.youtube.com/watch?v=ApLO1EhjMQY, Jul. 20, 2020.

"How to View and Close Open Files in Windows Server SMB Share?", WindowsOS Hub; retrieved from: https://web.archive.org/web/20221020230615/https://woshub.com/managing-open-files-windows-server-share/, Aug. 13, 2020.

"Managing Permissions in the VMware Host Client", VMWare Docs; retrieved from: https://docs.vmware.com/en/VMware-vSphere/7.0/com.vmware.vsphere.hostclient.doc/GUID-8F7CEFFA-B91A-4DE8-94A4-5A9257A04539.html, May 31, 2019.

"NAS Backup Support", Veeam Help center; retrieved from: https://helpcenter.veeam.com/archive/backup/100/vsphere/file_share_support.html#file_proxy, Jul. 9, 2021.

"Overview of the vSphere Auto Deploy Process by Using the vSphere Client", VMWare Docs; retrieved from: https://docs.vmware.com/en/VMware-vSphere/7.0/com.vmware.esxi.install.doc/GUID-33565F1C-5132-4953-8957-8982E87D86D7.html, Feb. 11, 2020.

"POSIX™ 1003.1 Frequently Asked Questions (FAQ Version 1.18)", retrieved from: https://www.opengroup.org/austin/papers/posix_faq.html, Jun. 13, 2020.

"Rebalance file servers manually in vSAN 7.0", VMware Customer Connect; retrieved from: https://kb.vmware.com/s/article/80481, Oct. 6, 2020.

"Recovering a vSAN disk group from a failed ESXi host", VirtualSlices; retrieved from: https://www.virtualslices.com/2019/09/recovering-vsan-disk-group-from-a-failed-esxi-host/, Sep. 12, 2019.

"TAM Lab 087—Setup and Use vSAN File Services", Youtube.com; retrieved from: https://www.youtube.com/watch?v=4vW6vWhwtu4, Mar. 25, 2021.

"The Architecture of VMware ESXi", VMWare White Paper; retrieved from: https://www.vmware.com/content/dam/digitalmarketing/vmware/en/pdf/techpaper/ESXi_architecture.pdf, Oct. 24, 2008.

"The Open Virtual Machine Format Whitepaper for OVF Specification", VMWare; retrieved from https://www.vmware.com/pdf/ovf_whitepaper_specification.pdf, Sep. 9, 2007.

"Virtual Volumes and Replication Groups", VMWare Docs; retrieved from: https://web.archive.org/web/20220324234540/https://docs.vmware.com/en/VMware-vSphere/7.0/com.vmware.vsphere.storage.doc/GUID-365225BE-A87B-46F0-9112-53D7B2ED5028.html, Sep. 26, 2019.

"VMware Horizon on VMware vSAN Best Practices—Technical White Paper", VMWare; retrieved from: https://www.vmware.com/content/dam/digitalmarketing/vmware/en/pdf/products/vsan/vmware-horizon-7-on-vmware-vsan-best-practices.pdf, Dec. 2020.

"VMware vSAN Technology Overview", VMwareStorage, VMware, retrieved from https://core.vmware.com/resource/vmware-vsan-technology-overview, Sep. 2020.

"VSAN—File Services", Cloud Architecture blog, retrieved from: https://agmalanco.com/2021/05/07/vsan-file-services/; English Translation, May 7, 2021.

"VSAN NFS Share Configuration in VMware vSphere 7.0", retreieved from https://www.virtualizationhowto.com/2020/07/vsan-nfs-share-configuration-in-vmware-vsphere-7-0/, Jul. 24, 2020.

"VSphere Storage", VMWare Update 2, VMware vSphere 6.7, VMWare EXSi 6.7, vCenter Server 6.7; retrieved from: https://docs.vmware.com/en/VMware-vSphere/6.7/vsphere-esxi-vcenter-server-672-storage-guide.pdf, Apr. 11, 2019.

"WSFC with Native Shared Disks on vSAN", Virtually Sensei; retrieved from: https://virtuallysensei.com/vsan-6-7-u3-native-shared-disks/, Dec. 8, 2019.

Adam, Michael, "Samba's Way Toward SMB 3.0", vol. 38, No. 1 | https://www.usenix.org/system/files/login/articles/03adam_016-025_online.pdf, Feb. 2013, pp. 16-25.

Bergamasco, Davide, "Content Library Performance Tuning", VMware VROOM! Performance Blog; received from: https://blogs.vmware.com/performance/2015/09/content-library-performance-tuning.html, Sep. 15, 2015.

Bergamasco, Davide, "How to Efficiently Synchronize, Import and Export Content in VMware vSphere Content Library", VMware VROOM! Performance Blog; retrieved from: https://blogs.vmware.com/performance/2015/09/efficiently-synchronize-import-export-content-vmware-vsphere-content-library.html, Sep. 3, 2015.

Epping, "Introducing vSAN File Services as part of vSAN 7.0", retrieved from: https://www.yellow-bricks.com/2020/03/17/introducing-vsan-file-services-as-part-of-vsan-7-0/, Mar. 17, 2020.

Epping, "Scaling out a vSAN Cluster with File Services enabled", Youtube.com; retrieved from: https://www.youtube.com/watch?v=1fkPGIOPQ6E, Apr. 10, 2020.

Epping, "Scaling out your vSAN File Services Cluster", YellowBricks Blog; retrieved from: https://www.yellow-bricks.com/2020/04/10/scaling-out-your-vsan-file-services-cluster/, Apr. 10, 2020.

Epping, "vSAN File Services considerations", YellowBricks blog; retrieved from: https://www.yellow-bricks.com/2020/04/15/vsan-file-services-considerations/, Apr. 15, 2020.

Hickey, Nigel, "Creating and Using Content Library", VMware—VMware vSphere Blog; retrieved from: https://blogs.vmware.com/vsphere/2020/01/creating-and-using-content-library.html, Jan. 22, 2020.

Hickey, Nigel, "The Evolution of Content Library", VMware VMware vSphere Blog; retrieved from: https://blogs.vmware.com/vsphere/2019/12/the-evolution-of-content-library.html, Dec. 3, 2019.

Koehler, "Options in scalability with vSAN", VMWare; Virtual Blocks Blog; retrieved from: https://blogs.vmware.com/virtualblocks/2016/09/15/options-scalability-virtual-san/, Sep. 15, 2016.

Lüke, "Interaction Between the User and Kernel Space in Linux", retrieved from: https://pothos.github.io/papers/linux_userspace_kernel_interaction.pdf, 2018.

Oberacher, Peter, "vSAN: A Glance Behind the Curtain", VMware by Broadcom Livefire Solutions; retrieved from: https://www.livefire.solutions/vsan/vsan-a-glance-behind-the-curtain/, Aug. 6, 2019.

Seget, Vladan, "VMware vSAN 7 U1: Configure vSAN File Service", retrieved from: https://4sysops.com/archives/vmware-vsan-7-u1-configure-vsan-file-service/, Nov. 11, 2020.

"Data Object—VsanFileServiceIpConfig(vim.vsan.FileServiceIpConfig)", retrieved from: https://vdc-download.vmware.com/vmwb-repository/dcr-public/90ec343b-df7c-493e-9979-36ea55765102/8753fd1e-fcab-4bd4-9cde-a364851f31a6/vim.vsan.FileServiceIpConfig.html, Mar. 15, 2021.

"Top-3 New Features in vSAN 7: #2—vSAN File Services", VMware Virtual Blocks Blog; retrieved from https://blogs.vmware.com/virtualblocks/2020/03/25/part-2-top-new-features-vsan-7-vsan-file-services/, Mar. 25, 2020.

"vSAN 7 U1 File Services Performance and Capacity Monitoring", Youtube.com; retrieved from: https://www.youtube.com/watch?v=Vk8_4Q_jhv8&t=22s, Sep. 17, 2020.

* cited by examiner

SCOPE-BASED DISTRIBUTED LOCK INFRASTRUCTURE FOR VIRTUALIZED FILE SERVER

CROSS-REFERENCE TO RELATED APPLICATIONS

This application claims priority to Provisional Application No. 63/162,994, filed Mar. 18, 2021. The aforementioned application is incorporated herein by reference, in its entirety, for any purpose.

BACKGROUND

Managing shared resources in distributed computing systems often includes providing locks on shared resources. Locks may help assure that, for example, there are not several versions of shared files and directories. Managing locks on shared resources may be difficult, particularly as the number of processes using shared resources, and the types and varieties of operations performed on shared resources grows.

DETAILED DESCRIPTION

Figure 1:
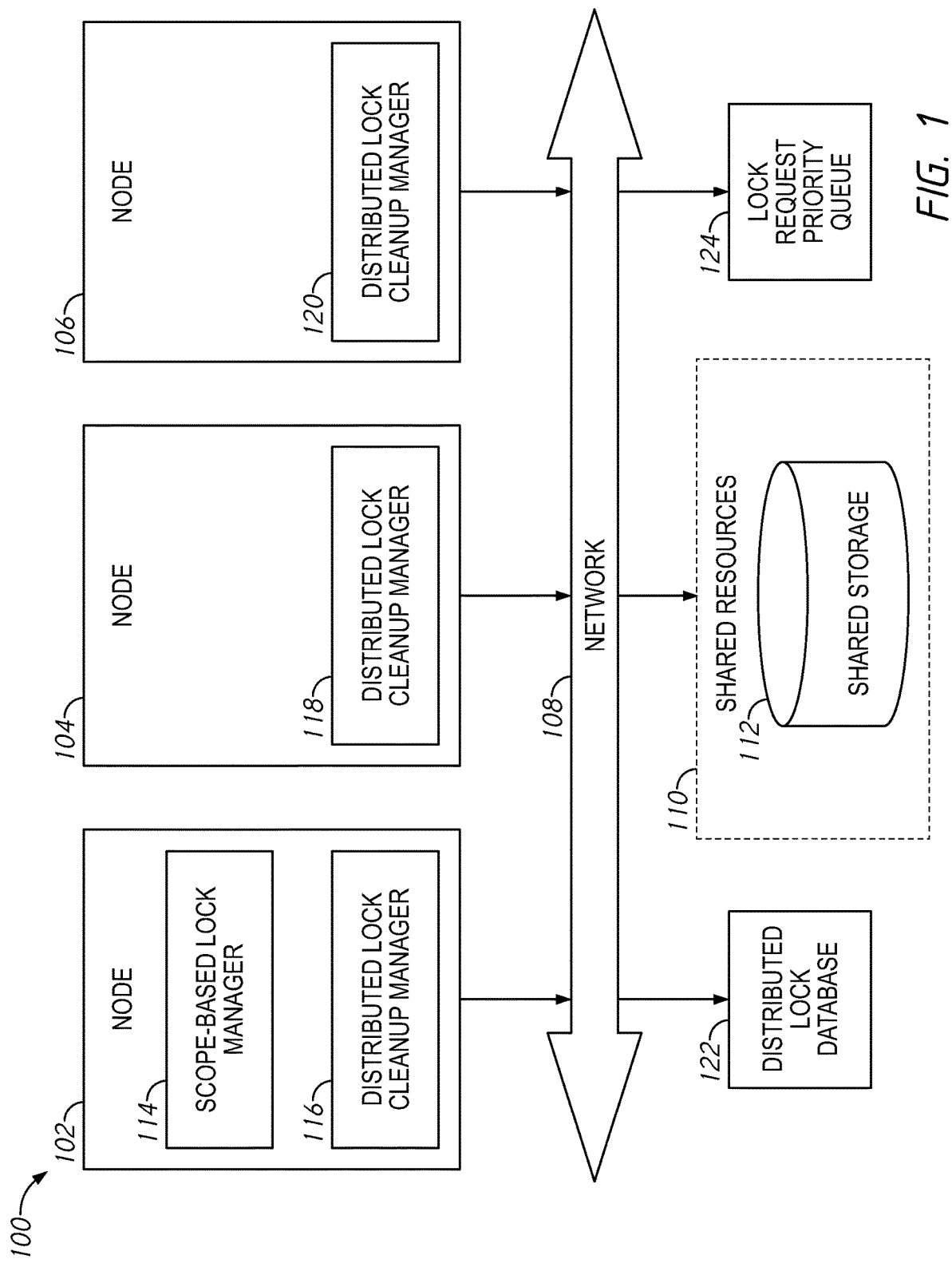
FIG. 1 illustrates an example distributed computing system hosting a scope-based lock manager in accordance with embodiments of the present disclosure.

In distributed computing systems, shared resources are often accessible by various applications, processes, and users. Often a process accessing a shared resource may request (e.g., place) a lock on the resource, such that other users or processes do not change the state of the resource as it is accessed or used by the process. For example, shared file systems accessible by many users may include locks to prevent more than one user from editing a file at a time, which could result in discrepancies between the file, loss of changes by one or multiple users, or other issues reducing the utility of a shared file system. Other shared resources such as data structures, storage resources, peripheral resources (e.g., printers) may similarly be locked by processes, applications, users, or other entities within a distributed computing system to perform tasks requesting exclusive use of the shared resource.

The process of granting and releasing locks in distributed computing systems is often coordinated and facilitated by a distributed lock manager (DlM). Some DLMs include a centralized lock manager that grants and releases node-level locks for nodes in the distributed computing system in communication with local lock managers at each computing node managing locks for the node. In such DLMs, a process requesting a lock may communicate with the local lock manager to request a lock on behalf of the process. The local lock manager then communicates a request for a lock to the centralized lock manager, which then grants the lock to the local lock manager if another node does not already have a lock on the resource. Such systems may not be adapted to grant locks to distributed processes (e.g., processes executing at multiple computing nodes of a computing system) or processes, services, or applications external to the distributed computing system which may request access to and/or locks on shared resources hosted at the distributed computing system.

Further, DLMs used to manage locks for distributed computing systems often include multiple lock managers, where each lock manager manages locks of a single scope or on a single type of resource. As a result, lock management for the distributed computing system may be dependent on multiple lock managers, such that the lock management is vulnerable to failure of one of many lock managers. Failure of one lock manager may result in loss of information about the locks granted by that lock manager, leading to deadlocks (e.g., no entity is able to obtain a lock on a resource because the resource remains effectively locked), inconsistent state of the shared resources, and failure of lock management as a whole, example, in many distributed computing systems, a centralized lock manager may be limited to granting node-level locks and local lock managers may manage process-level locks after obtaining a node-level lock from the centralized lock manager. In such systems, no one lock manager has or can access information on which processes, applications, and nodes of the distributed computing system hold locks on resources. If, for example, the centralized lock manager becomes unresponsive or crashes, it is very difficult for the distributed computing system to determine an overall lock state for shared resources and the process of granting and releasing node-level locks may be disrupted.

Examples described herein describe a distributed lock system including a scope-based lock manager which manages lock requests of multiple scopes relative to the distributed computing system and manages lock cleanup for granted locks based on the scope of the granted locks. The scope-based lock manager may maintain a lock database including information about granted locks and which entity in the system holds the lock. The lock database may be accessible from any computing node in the distributed computing system, such that the overall state of the shared resources of the distributed computing system is more easily ascertained and not reliant on cooperation between multiple lock managers. The scope-based lock manager may reduce duplication in processing tasks in DLMs that may otherwise include multiple lock managers. The scope-based lock manager may handle requests for locks from entities outside of the distributed computing system (e.g., a cluster) and may manage locks on behalf of processes, applications, services, or other entities distributed across multiple nodes of the distributed computing system.

In various examples described herein, a scope-based lock manager may communicate with distributed lock cleanup managers to perform lock cleanup (e.g., to remove unused or terminated locks). For example, a lock cleanup manager may be provided at each node of the distributed computing system (e.g., at each node of a cluster). Distributed lock cleanup managers may communicate with a scope-based lock manager upon failure or termination of a process, application, service, thread, or other lock-holding entity, which may be hosted by a computing node, so that the scope-based lock manager can clean up (e.g., release) any locks held by the failed or terminated entity. However, unlike DLMs using local lock managers, the scope-based lock manager may continue to handle granting and releasing of locks for processes on individual computing nodes and the overall lock state of the distributed computing system may be independently maintained at the lock database, such that failure of a distributed lock cleanup manager or a computing node does not generally result in loss of the state of locks on shared resources of the distributed computing system. Rather, on failure of a node or loss of communication with a distributed lock cleanup manager, the scope-based lock manager may clean up locks granted to the node and entities within the scope of the node (e.g., hosted entirely on the node), such that the overall process of granting and releasing locks for the distributed computing system may continue generally uninterrupted.

As described herein, a distributed computing system may include various entities, such as multiple computing nodes. Each of the multiple computing nodes may host processes or various collections of processes, which may be executing at any of the computing nodes. In this manner, each of the computing nodes forming the distributed computing system may be referred to as an entity encompassing all processes executing at that node. Other entities may include, for example, an application executing at a computing node of the distributed computing system, an application process executing at a computing node, a thread executing at a computing node, or an instance of a service executing at a computing node. An entity hosted by the distributed computing system may also, in some examples, include processes executing at two or more nodes of the distributed computing system. For example, an application or service may be an entity hosted by the distributed computing system and may include instances at multiple computing nodes of the distributed computing system. Entities, as used herein, may also include processes, applications, services, or other similar constructs external to the distributed computing system having access to shared resources of the distributed computing system.

Locks and lock requests as used herein may be held or requested by a target (e.g., a holding entity, which may also be referred to as a target entity). When the target (e.g., an entity such as a node, process, or collection of processes) holds a lock on a resource, processes of the distributed computing system (or with access to shared resources of the distributed computing system) that are not part of the entity are unable to access the resource. A target may be, in various embodiments, a computing node, an application or service executing on a computing node, a process executing on a computing node, an application or service distributed across multiple computing nodes of the distributed computing system.

As used herein, scope refers to an extent of an entity relative to the distributed computing system. The scope of a lock or lock request may refer to the scope of the target of the lock. Scopes may be defined by a construct or category defining an entity, such as, for example, an application, service, computing node, process, thread, distributed application, external service, etc. Specific categories of scopes may vary between distributed computing systems based on types of entities hosted or configured to be hosted by the distributed computing system. Scopes may be referenced in terms of various entities or processes which may be "within" or "encompassed by" a scope. For example, an application may be within and encompassed by the scope of a computing node when the application encompasses only processes executing on the computing node. Similarly, a process may be within and encompassed by the scope of an application when the process is exclusively utilized by, created by, or is otherwise a part of the application. In this manner, entities may request locks of various scopes in accordance with examples described herein. Examples of lock scopes include process locks and node locks. An entity may request a lock with a process scope, meaning that processes other than the process holding the lock may not access the resource. An entity may request a lock with a node scope, meaning that entities hosted by nodes other than the node associated with the lock may not access the resource. However, multiple processes running on a node associated with the lock may all access the resource when locked with a lock with a node scope.

Various embodiments of the present disclosure will be explained below in detail with reference to the accompanying drawings. Other embodiments may be utilized, and structural, logical, and electrical changes may be made without departing from the scope of the present disclosure. The various embodiments disclosed herein are not necessarily mutually exclusive, as some disclosed embodiments can be combined with one or more other disclosed embodiments.

Turning now to the figures, FIG. 1 illustrates an example distributed computing system 100 hosting a scope-based lock manager 114 in accordance with embodiments of the present disclosure. The distributed computing system 100 includes nodes 102, 104, and 106 which communicate with one another and access shared resources 110 via a network 108. The distributed lock manager includes a scope-based lock manager 114 hosted by at least one node of the distributed computing system 100 and distributed lock cleanup managers 116, 118, 12.0 hosted at nodes of the distributed computing system 100.

Computing nodes 102, 104, and 106 may be computing devices forming a distributed computing system 100 through communication over the network 108 using, for example, a local area network (LAN) or wide area network (WAN) protocol. As described further herein, the nodes 102, 104, and 106 may be configured to host various types of software and may, in some embodiments, form a virtualization environment, example, in some embodiments, the nodes 102, 104, and 106 may each host a software stack including a hypervisor configured to virtualize the computing resources of the nodes for virtual machines, including client virtual machines. In some embodiments, the nodes 102, 104, and 106 may host container dockers such that the nodes may host various containers providing execution environments for applications, services, client processes, and the like.

The distributed computing system 100 may include shared resources 110 accessible to nodes of the distributed computing system 100. In some examples, shared resources 110 may include resources primarily managed or hosted by the distributed computing system 100 and accessible from outside of the distributed computing system 100. Shared resources 110 may include shared storage 112, which may, in various embodiments, include storage local to the nodes 102, 104, and/or 106, network attached storage, cloud based storage, and the like. In some embodiments, shared storage 112 may be organized into one or more storage pools managed by a virtualized file server (e.g., a virtualized file system) hosted on the distributed computing system 100. Other shared resources 110 may include, in various examples, peripheral or hardware devices such as, for example, printers, output devices, etc.

The distributed lock management system may be implemented by the scope-based lock manager 114 and the distributed lock cleanup managers 116, 118, and 120. In various embodiments, the scope-based lock manager 114 and the distributed lock cleanup managers 116, 118, and 120 cooperate to manage access to the shared resources 110 of the distributed computing system 100. In some embodiments, one of the computing nodes of the distributed computing system 100 (node 102 in FIG. 1) may host a scope-based lock manager 114. In some embodiments, the scope-based lock manager 114 may be hosted remotely from the distributed computing system 100 by an entity (e.g., another computing system) in communication with the distributed computing system 100. Generally, each of the computing nodes 102, 104, and 106 hosts a distributed lock cleanup manager communicating with the scope-based lock manager 114 on behalf of the node. In some embodiments, other distributed lock cleanup managers may be hosted by other entities in communication with the distributed computing system 100 to, for example, request locks on behalf of entities distributed across the nodes of the distributed computing system 100 or request locks on behalf of external entities that may request locks on shared resources 110 of the distributed computing system 100.

In some examples, the scope-based lock manager 114 may receive one or more requests for locks of shared resources 110 of the distributed computing system 100. A request may specify a scope of the requested lock. The scope-based lock manager 114 may grant locks for resources of the shared resources 110. In some examples, the scope-based lock manager 114 may determine when and/or how to release locks for the shared resources 110. Release of the locks may be performed by the scope-based lock manager in a manner that is based on the scope of the locks. For example, the scope of the lock may be used to determine whether the lock should be released responsive to the termination or failure of a particular entity in the distributed computing system.

In various embodiments, the scope-based lock manager 114 may maintain a distributed lock database 122. The distributed lock database 122 may store details of locks held on the shared resources 110 of the distributed computing system 100. For example, the distributed lock database 122 may store, for each lock, a lock identification, a scope of the lock, a resource locked by the lock, a target associated with the lock (e.g., an entity requesting the lock), a timestamp when the lock was requested, and/or a duration of the lock. The distributed lock database 122 may be stored at a location accessible to each node in the distributed computing system 100. In the case of failure of the node 102 hosting the scope-based lock manager 114, the distributed lock database 122 may nonetheless be accessed by another node in the distributed computing system 100. Another node may then host the scope-based lock manager for the distributed computing system 100. In this manner, failure of a node of a distributed computing system may not impede management of the locks for shared resources of the distributed computing system. The scope-based lock manager 114 may manage a queue 124 to track queued requests for locks of one or more of the shared resources 110. For example, where the scope-based lock manager 114 receives a request for a lock on a resource that is already locked by another entity of the distributed computing system 100, the scope-based lock manager 114 may store the request in the queue 124 until the other lock on the resource is released. Eke the distributed lock database 122, the queue 124 may be maintained or stored at a location accessible to each node in the distributed computing system 100.

The distributed lock database 122 may store information about granted locks on the shared resources 110, including, in various examples, the resource to be locked (which may, in some embodiments, include a specific portion of a resource, such as a row of a spreadsheet, a page of a file, a tile, a directory), a target for the lock, and a scope of the lock. In some embodiments, the distributed lock database 122 may also store information about the type of lock (e.g., a read/write lock, a concurrent read lock, etc.). Scope information in the distributed lock database 122 may be, in some embodiments, stored by storing an identifier of the target of the lock, where the identifier indicates the scope of the target. For example, a node scope lock may be associated with a target node, identified in the distributed lock database 122 by a node identifier. The scope-based lock manager 114 may categorize locks having targets identified with only a node identifier as node scope locks. The scope-based lock manager 114 may similarly categorize locks having targets identified with a node identifier, a process identifier, and a thread identifier as thread scope locks and/or may categorize locks having targets identified with a node identifier and a process identifier as process scope locks. Other scopes of locks (e.g., service scope locks or distributed service scope locks) may be categorized by the scope-based lock manager 114 based on their targets including multiple identifiers of a certain scope. For example, a service scope lock may have a target identified with a node identifier and multiple process identifiers. A distributed service scope lock may have a target identified with multiple node identifiers and multiple process identifiers. Other types of locks may have targets identified with, for example, identifiers of external entities. Other mechanisms for identifying the scopes of locks may be used in some examples (e.g., scope IDs).

The queue 124 may be implemented, in various examples, using a heap, queue, or other data structure. The queue 124 may be polled and/or accessed by the scope-based lock manager 114 when an existing lock is released or cleaned up (e.g., deleted or removed). The lock manager 114 may grant stored lock requests in the queue 124 when able (e.g., when one or more conflicting locks have been released or otherwise cleaned up). In some embodiments, queue 124 may store or include one or more callback mechanisms to provide status of the lock request (e.g., acquired, queued, granted) to the requesting entity. The status may be provided at any number of times or frequencies, including periodically and/or responsive to status changes (e.g., when the lock is granted).

Distributed lock cleanup managers 116, 118, and 120 may, in various examples, communicate with the scope-based lock manager 114 to request locks on shared resources 110 on behalf of entities hosted by (e.g., executing on) computing nodes 102, 104, and 106, respectively. Distributed lock cleanup managers 116, 118, and 120 may be implemented using, for example, one or more software instances. In some examples, the distributed lock cleanup manager 116, 118, and 120 may each represent instances of a distributed service. In some examples, the distributed lock cleanup managers may be implemented using one or more virtual machines and/or one or more containers. The distributed lock cleanup managers may communicate lock cleanup requests to the scope-based lock manager 114 when, for example, entities executing at the host terminate unexpectedly or otherwise fail without first releasing a lock granted by the scope-based lock manager 114. For example, where node 104 hosts a process having a process scope lock on a file in shared storage 112, the distributed lock cleanup manager 118 may poll the process to ensure that the process has not stopped running or become otherwise unreachable. When the distributed lock cleanup manager 118 determines that the process has stopped, the distributed lock cleanup manager 118 may communicate a lock cleanup request with a process identifier of the stopped process to the scope-based lock manager 114, and the scope-based lock manager 114 may then initiate lock cleanup for the process, which may include releasing locks in the distributed lock database 122 where the process is the target of the lock and clearing lock requests from the queue 124 where the process is the target of the lock request. Accordingly, the scope-based lock manager 114 is responsible for lock management for the distributed computing system 100 and the nodes 104 and 106 may not host other, local lock managers to implement the distributed lock system. Rather, the distributed lock cleanup managers 116, 118, and 120 may extend the polling mechanism for the scope-based lock manager 114. While FIG. 1 illustrates a single distributed lock cleanup manager for each node, in some examples, one distributed lock cleanup manager hosted by one node may provide communications with the scope-based lock manager for multiple nodes. For example, the distributed lock cleanup manager 116 may in some examples provide communications regarding locks associated with both nodes 102 and 104.

In part due to the architecture of example distributed lock systems described herein, the locking and unlocking mechanisms of the distributed computing system 100 may be less likely to be seriously disrupted by node failure than in DRAMs implemented by multiple lock managers. For example, where the node 104 or the node 106 fail, the scope-based lock manager 114 may clean up all locks within the node scope of the failed node and continue on with normal operation. As the lock management functionality is located centrally at the scope-based lock manager 114, lock management is not otherwise disrupted by failure of the node 104 or the node 106. Where the node 102 hosting the scope-based lock manager 114 fails, the distributed lock database 122 and the queue 124 may be stored in a location accessible to nodes 104 and 106, such that a new instance of the scope-based lock manager may be created on one of the nodes 104 or 106 using the distributed lock database 122 and queue 124 to resume lock management operations. Accordingly, shared resources 110 are less likely to be corrupted, duplicated, or otherwise negatively affected by node failure.

Though the distributed computing system 100 is shown with three computing nodes, various distributed computing systems hosting distributed lock systems as described herein may include different numbers of computing nodes which may be configured in other arrangements not shown in FIG. 1 without departing from the scope of the disclosure.

Figure 2:
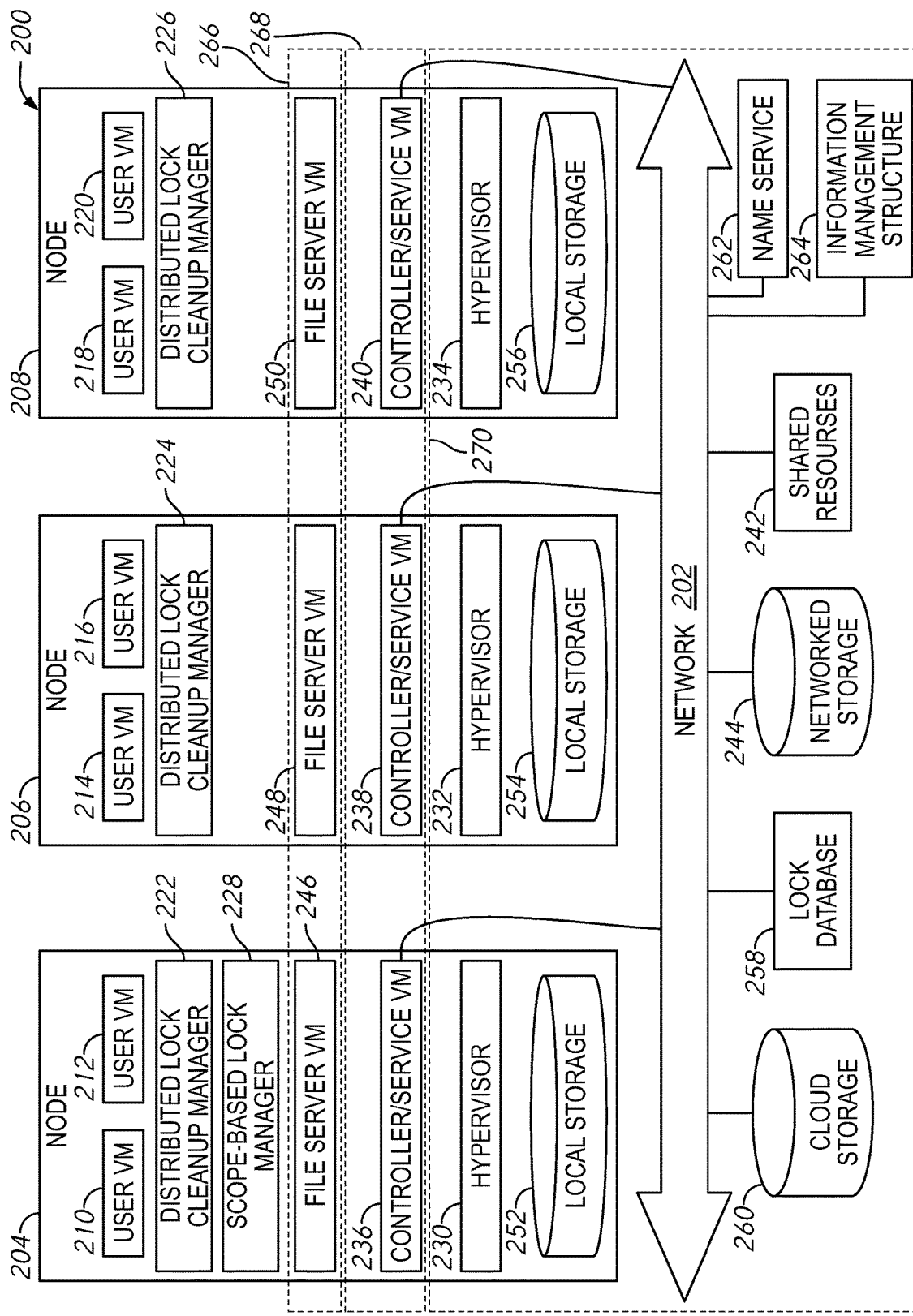
FIG. 2 is a schematic illustration of a distributed computing system hosting a virtualized file server and a scope-based lock manager arranged in accordance with embodiments of the present disclosure.

FIG. 2 is a schematic illustration of a distributed computing system 200 hosting a virtualized file server and a scope-based lock system arranged in accordance with examples described herein. The distributed computing system 200, which may be a virtualized system and/or a clustered virtualized system, includes a virtualized file server 266 and a distributed lock system, including a scope-based lock manager 228 and distributed lock cleanup managers 222, 224, and 226. The scope-based lock manager 228 may be used to implement or may be implemented by the scope-based lock manager 114 of FIG. 1. Similarly, the distributed lock cleanup managers 222, 224, and 226 may be used to implement or may be implemented by the distributed lock cleanup managers 116, 118, 120 of FIG. 1.

Examples of distributed lock systems may be implemented using one or more virtual machines, containers or both. For example, the scope-based lock manager 228 and each of the distributed lock cleanup managers 222, 224, and 226 may be implemented using either virtual machines or containers. The distributed lock system may manage locks for shared resources accessible by processes executing at any of the nodes 204, 206, or 208 of the distributed computing system 200, as well as external processes having access to the shared resources 242 of the distributed computing system 200. Information about locks on the shared resources 242 may be stored at a lock database 258. The shared resources 242 may be used to implement or may be implemented by shared resources 110 of FIG. 1. Similarly, the lock database 258 may be used to implement or may be implemented by the distributed lock database 122 of FIG. 1. In various embodiments, the lock database 258 may be distributed across various storage devices or stored at a single storage device. Storage devices storing all or a portion of the lock database 258 may include, in various examples, local storage 252, 254, or 256, networked storage 244, cloud storage 260, or other storage locations accessible by the distributed computing system 200.

The system of FIG. 2 can be implemented using a distributed computing system. Distributed computing systems generally include multiple computing nodes (e.g., physical computing resources)—host machines 204, 206, and 208 are shown in FIG. 2—that may manage shared storage, which may be arranged in multiple tiers. The storage may include storage that is accessible through network 202, such as, by way of example and not limitation, cloud storage 260 (e.g., storage accessible through the Internet), networked storage 244 (or network-attached storage, which may be accessible, in some examples, through a LAN), or storage area network (SAN). Examples described herein may also or instead permit local storage 252, 254, and 256 that is incorporated into or directly attached to a host machine of the distributed computing system 200 to managed as part of a storage pool 270. Accordingly, the storage pool 270 may include local storage of one or more of the computing nodes in the system, storage accessible through a network, or both local storage of one or more of the computing nodes in the system and storage accessible over a network. Examples of local storage may include solid state drives (SSDs), hard disk drives (HDDs, and/or "spindle drives"), optical disk drives, external drives (e.g., a storage device connected to a host machine via a native drive interface or a serial attached SCSI interface), or any other direct-attached storage. These storage devices, both direct-attached and/or network-accessible, collectively form the storage pool 270. Virtual disks (or "vDisks") may be structured from the physical storage devices in storage pool 270. A vDisk generally refers to a storage abstraction that is exposed by a component (e.g., a virtual machine, hypervisor, and/or container described herein) to be used by a client (e.g., a user VM, such as user VM 210). In examples described herein, controller or service VMs (e.g., controller/service VMs 236, 238, and/or 240 of FIG. 2*j* may provide access to vDisks. In other examples, access to vDisks may additionally or instead be provided by one or more hypervisors (e.g., hypervisors 230, 232, and/or 234). In some examples, the vDisk may be exposed via iSCSI ("internet small computer interface") or NFS ("network file system") and may be mounted as a virtual disk on one or more user VMs. In some examples, vDisks may be organized into one or more volume groups (VGs).

Each host machine (or node) 204, 206, 208 may run virtualization software. Virtualization software may include one or more virtualization managers (e.g., one or more virtual machine managers, such as one or more hypervisors, and/or one or more container managers). Examples of virtualization managers include NUTANIX AHV, VMWARE ESX(I), MICROSOFT HYPER-V, DOCKER, REDHAT KVM, and Kubernetes. The virtualization software shown in FIG. 2 includes hypervisors 230, 232, and 234 which may create, manage, and/or destroy user VMs, as well as manage interactions between the underlying hardware and user VMs. While hypervisors are shown in FIG. 2, containers may be used in addition to or instead of hypervisors in other examples. User VMs may run one or more applications that may operate as "clients" with respect to other elements within the distributed computing system 200. While shown as virtual machines in FIG. 2, containers may be used to implement client processes in other examples. Hypervisors may connect to one or more networks, such as network 202 of FIG. 2 to communicate with storage pool 270 and/or other computing systems or components.

In some examples, controller or service virtual machines (CVMs), such as CVMs 236, 238, and 240 of FIG. 2 are used to manage storage and input/output (I/O) activities according to particular embodiments. While examples are described herein using CVMs to manage storage I/O activities, in other examples, container managers and/or hypervisors may additionally or instead be used to perform described CVM functionality. The arrangement of virtualization software should be understood to be flexible. In some examples, CVMs act as the storage controller. Multiple such storage controllers may coordinate within a cluster to form a unified storage controller system. CVMs may run as virtual machines on the various host machines, and work together to form a distributed system that manages all storage resources, including local storage, networked storage 244, and cloud storage 260. The CVMs may connect to network 202 directly, or via a hypervisor. Since the CVMs run independent of hypervisors 230, 232, 234, in examples where CVMs provide storage controller functionally, the system may be implemented within any virtual machine architecture, since the CVMs of particular embodiments can be used in conjunction with any hypervisor from any virtualization vendor. In other examples, the hypervisor may provide storage controller functionality and/or one or containers may be used to provide storage controller functionality (e.g., to manage I/O request to and from the storage pool 270).

A host machine may be designated as a leader node within a cluster of host machines forming a distributed computing system. For example, host machine 204 may be a leader node. A leader node may have a software component designated to perform operations of the leader. For example, CVM 236 on host machine 204 may be designated to perform such operations. A leader may be responsible for monitoring or handling requests from other host machines or software components on other host machines throughout the virtualized environment. If a leader fails, a new leader may be designated. In particular embodiments, a management module (e.g., in the form of an agent) may be running on a leader node. In various embodiments the scope-based lock manager 228 may execute as an agent on the leader node.

Virtual disks may be made available to one or more user processes. In the example of FIG. 2, each CVM 236, 238, and 240 may export one or more block devices or NFS server targets that appear as disks to user VMs 210, 212, 214, 216, 218, and 220. These disks are virtual, as they are implemented by the software running inside CVMs 236, 238, and 240. Thus, to user VMs, CVMs appear to be exporting a clustered storage appliance that contains some disks. User data (e.g., including the operating system in some examples) of the user VMs may reside on these virtual disks.

Performance advantages can be gained in some examples by allowing the virtualization system to access and utilize local storage 252, 254, and 256. This is because I/O performance may be much faster when performing access to local storage as compared to performing access to network-attached storage 244 across a network 202. This faster performance for locally attached storage can be increased even further by using certain types of optimized local storage devices, such as SSDs.

As a user process (e.g., a user VM) performs I/O operations (e.g., a read operation or a write operation), the I/O commands may be sent to the hypervisor that shares the same server as the user process, in examples utilizing hypervisors. For example, the hypervisor may present to the virtual machines an emulated storage controller, receive an I/O command and facilitate the performance of the I/O command (e.g., via interfacing with storage that is the object of the command, or passing the command to a service that will perform the I/O command). An emulated storage controller may facilitate I/O operations between a user VM and a vDisk. A vDisk may present to a user VM as one or more discrete storage drives, but each vDisk may correspond to any part of one or more drives within storage pool 270. Additionally or alternatively, CVMs 236, 238, 240 may present an emulated storage controller either to the hypervisor or to user VMs to facilitate I/O operations. CVMs 236, 238, and 240 may be connected to storage within storage pool 270. CVM 236 may have the ability to perform I/O operations using local storage 252 within the same host machine 204, by connecting via network 202 to cloud storage 260 or network-attached storage 244, or by connecting via network 202 to local storage 254 or 256 within another host machine 206 or 208 (e.g., via connecting to another CVM 238 or 240). In particular embodiments, any computing system may be used to implement a host machine.

Examples described herein include virtualized file servers that provide virtualized file systems. A virtualized file server may be implemented using a cluster of virtualized software instances (e.g., a cluster of file server virtual machines). A virtualized file server 266 is shown in FIG. 2 including a cluster of file server virtual machines. The file server virtual machines may additionally or instead be implemented using containers. In some examples, the VFS 266 provides file services to user VMs 210, 212, 214, 216, 218, and 220. The file services may include storing and retrieving data persistently, reliably, and/or efficiently in some examples. The user virtual machines may execute user processes, such as office applications or the like, on host machines 204, 206, and 208. The stored data may be represented as a set of storage items, such as files organized in a hierarchical structure of folders (also known as directories), which can contain files and other folders, and shares, which can also contain files and folders.

In particular embodiments, the VFS 266 may include a set of File Server Virtual Machines (FSVMs) 246, 248, and 250 that execute on host machines 204, 206, and 208. The set of tile server virtual machines (FSVMs) may operate together to form a cluster. The FSVMs may process storage item access operations requested by user VMs executing on the host machines 204, 206, and 208. The FSVMs 246, 248, and 250 may communicate with storage controllers provided by CVMs 236, 238, 240 and/or hypervisors executing on the host machines 204, 206, 208 to store and retrieve files, folders, SMB shares, or other storage items. The FSVMs 246, 248, and 250 may store and retrieve block-level data on the host machines 204, 206, 208, e.g., on the local storage 252, 254, 256 of the host machines 204, 206, 208. The block-level data may include block-level representations of the storage items. The network protocol used for communication between user VMs, FSVMs, CVMs, and/or hypervisors via the network 202 may be Internet Small Computer Systems Interface (iSCSI), Server Message Block (SMB), Network File System (NFS), pNFS (Parallel NFS), or another appropriate protocol.

Generally, FSVMs may be utilized to receive and process requests in accordance with a file system protocol e.g., NFS, SMB. In this manner, the cluster of FSVMs may provide a file system that may present files, folders, and/or a directory structure to users, where the files, folders, and/or directory structure may be distributed across a storage pool in one or more shares.

For the purposes of VFS 266, host machine 204 may be designated as a leader node within a cluster of host machines. In this case, FSVM 246 on host machine 204 may be designated to perform such operations. A leader may be responsible for monitoring or handling requests from FSVMs on other host machines throughout the virtualized environment. If FSVM 246 fails, a new leader may be designated for VFS 266.

In some examples, the user VMs may send data to the VFS 266 using write requests, and may receive data from it using read requests. The read and write requests, and their associated parameters, data, and results, may be sent between a user VM and one or more file server VMs (FSVMs) located on the same host machine as the user VM or on different host machines from the user VM. The read and write requests may be sent between host machines 204, 206, 208 via network 154, e.g., using a network communication protocol such as iSCSI, CIFS, SMB, TCP, IP, or the like. When a read or write request is sent between two VMs located on the same one of the host machines 204, 206, 208 (e.g., between the user VMs 210 and the FSVM 246 located on the host machine 204), the request may be sent using local communication within the host machine instead of via the network 202. Such local communication may be faster than communication via the network 202 in some examples. The local communication may be performed by, e.g., writing to and reading from shared memory accessible by the user VM 210 and the FSVM 246, sending and receiving data via a local "loopback" network interface, local stream communication, or the like.

In some examples, the storage items stored by the VMS 266, such as files and folders, may be distributed amongst storage managed by multiple FSVMs 246, 248, 250. In some examples, when storage access requests are received from the user VMs, the VFS 266 identifies FSVMs 246, 248, 250 at which requested storage items, e.g., folders, files, or portions thereof, are stored or managed, and directs the user VMs to the locations of the storage items. The FSVMs 246, 248, 250 may maintain a storage map, such as a sharding map, that maps names or identifiers of storage items to their corresponding locations. The storage map may be a distributed data structure of which copies are maintained at each FSVM 246, 248, 250 and accessed using distributed locks or other storage item access operations. In some examples, the storage map may be maintained by an FSVM at a leader node such as the FSVM 246, and the other FSVMs 248 and 250 may send requests to query and update the storage map to the leader FSVM 246. Other implementations of the storage map are possible using appropriate techniques to provide asynchronous data access to a shared resource by multiple readers and writers. The storage map may map names or identifiers of storage items in the form of text strings or numeric identifiers, such as folder names, files names, and/or identifiers of portions of folders or files (e.g., numeric start offset positions and counts in bytes or other units) to locations of the files, folders, or portions thereof. Locations may be represented as names of FSVMs, e.g., "FSVM-1", as network addresses of host machines on which FSVMs are located (e.g., "ip-addr1" or 128.1.1.10), or as other types of location identifiers.

When a user application, e.g., executing in a user VM 210 on host machine 204 initiates a storage access operation, such as reading or writing data, the user VM 210 may send the storage access operation in a request to one of the FSVMs 246, 248, 250 on one of the host machines 204, 206, 208. A FSVM 246 executing on a host machine 204 that receives a storage access request may use the storage map to determine whether the requested file or folder is located on and/or managed by the FSVM 246. If the requested file or folder is located on and/or managed by the FSVM 246, the FSVM 246 executes the requested storage access operation. Otherwise, the FSVM 246 responds to the request with an indication that the data is not on the FSVM 246, and may redirect the requesting user VM 210 to the FSVM on which the storage map indicates the file or folder is located. The client may cache the address of the FSVM on which the file or folder is located, so that it may send subsequent requests for the file or folder directly to that FSVM.

As an example and not by way of limitation, the location of a file or a folder may be pinned to a particular FSVM by sending a file service operation that creates the file or folder to a CVM, container, and/or hypervisor associated with (e.g., located on the same host machine as) the FSVM 246 the CVM 236 in the example of FIG. 2. The CVM, container, and/or hypervisor may subsequently processes file service commands for that file for the FSVM 246 and send corresponding storage access operations to storage devices associated with the file. In some examples, the FSVM may perform these functions itself. The CVM 236 may associate local storage 252 with the file if there is sufficient free space on local storage 252. Alternatively, the CVM 236 may associate a storage device located on another host machine 206, e.g., in local storage 254, with the file under certain conditions, e.g., if there is insufficient free space on the local storage 252, or if storage access operations between the CVM 236 and the file are expected to be infrequent. Files and folders, or portions thereof, may also be stored on other storage devices, such as the network-attached storage (NAS) network-attached storage 244 or the cloud storage 260 of the storage pool 270.

In particular embodiments, a name service 262, such as that specified by the Domain Name System (DNS) Internet protocol, may communicate with the host machines 204, 206, 208 via the network 202 and may store a database of domain names (e.g., host names) to IP address mappings. The domain names may correspond to FSVMs, e.g., fsvm1.domain.com or ip-addr1.domain.com for an FSVM named FSVM-1. The name service 262 may be queried by the user VMs to determine the IP address of a particular host machine (e.g., computing node 204, 206, 208) given a name of the host machine, e.g., to determine the IP address of the host name ip-addr1 for the host machine. The name service 262 may be located on a separate server computer system or on one or more of the host machines 204, 206, 208. The names and IP addresses of the host machines of the VFS 266, e.g., the host machines 204, 206, 208, may be stored in the name service 262 so that the user VMs may determine the IP address of each of the host machines 204, 206, 208, or FSVMs 246, 248, 250. The name of each VFS instance, e.g., FS1, FS2, or the like, may be stored in the name service 262 in association with a set of one or more names that contains the name(s) of the host machines 204, 206, 208 or FSVMs 246, 248, 250 of the VFS 266 instance. The FSVMs 246, 248, 250 may be associated with the host names ip-addr1, ip-addr2, and ip-addr3, respectively. For example, the file server instance name FS1.domain.com may be associated with the host names ip-addr1, ip-addr2, and ip-addr3 in the name service 262, so that a query of the name service 262 for the server instance name "FS1" or "FS1.domain.com" returns the names ip-addr1, ip-addr2, and ip-addr3. As another example, the file server instance name FS1.domain.com may be associated with the host names fsvm-1, fsvm-2, and fsvm-3. Further, the name service 262 may return the names in a different order for each name lookup request, e.g., using round-robin ordering, so that the sequence of names (or addresses) returned by the name service for a file server instance name is a different permutation for each query until all the permutations have been returned in response to requests, at which point the permutation cycle starts again, e.g., with the first permutation. In this way, storage access requests from user VMs may be balanced across the host machines, since the user VMs submit requests to the name service 262 for the address of the VFS instance for storage items for which the user VMs do not have a record or cache entry, as described below.

In particular embodiments, each FSVM may have two IP addresses: an external IP address and an internal IP address. The external IP addresses may be used by SMB/CFS clients, such as user VMs, to connect to the FSVMs. The external IP addresses may be stored in the name service 262. The IP addresses ip-addr1, ip-addr2, and ip-addr3 described above are examples of external IP addresses. The internal IP addresses may be used for iSCSI communication to CVMs, e.g., between the FSVMs 246, 248, 250 and the CVMs 236, 238, 240. Other internal communications may be sent via the internal IP addresses as well, e.g., file server configuration information may be sent from the CVMs to the FSVMs using the internal IP addresses, and the CVMs may get file server statistics from the FSVMs via internal communication.

Since the VFS 266 is provided by a distributed cluster of FSVMs 246, 248, 250, the user VMs that access particular requested storage items, such as files or folders, do not necessarily know the locations of the requested storage items when the request is received. A distributed file system protocol, e.g., MICROSOFT DFS or the like, may therefore be used, in which a user VM 210 may request the addresses of FSVMs 246, 248, 250 from a name service 262 (e.g., DNS). The name service 262 may send one or more network addresses of FSVMs 246, 248, 250 to the user VM 210. The addresses may be sent in an order that changes for each subsequent request in some examples. These network addresses are not necessarily the addresses of the FSVM on which the storage item requested by the user VM 210 is located, since the name service 262 does not necessarily have information about the mapping between storage items and FSVMs 246, 248, 250. Next, the user VM 210 may send an access request to one of the network addresses provided by the name service, e.g., the address of FSVM 246. The FSVM 246 may receive the access request and determine whether the storage item identified by the request is located on the FSVM 246. If so, the FSVM 246 may process the request and send the results to the requesting user VM 210. However, if the identified storage item is located on a different FSVM 248, then the FSVM 246 may redirect the user VM 210 to the FSVM 248 on which the requested storage item is located by sending a "redirect" response referencing the FSVM 248 to the user VM 210. The user VM 210 may then send the access request to FSVM 248, which may perform the requested operation for the identified storage item.

A particular VFS 266, including the items it stores, e.g., files and folders, may be referred to herein as a VFS "instance" and may have an associated name, e.g., FS1, as described above. Although a VFS instance may have multiple FSVMs distributed across different host machines, with different files being stored on FSVMs, the VFS instance may present a single name space to its clients such as the user VMs. The single name space may include, for example, a set of named "shares" and each share may have an associated folder hierarchy in which files are stored. Storage items such as files and folders may have associated names and metadata such as permissions, access control information, size quota limits, file types, files sizes, and so on. As another example, the name space may be a single folder hierarchy, e.g., a single root directory that contains files and other folders. User VMS may access the data stored on a distributed VFS instance via storage access operations, such as operations to list folders and files in a specified folder, create a new file or folder, open an existing file for reading or writing, and read data from or write data to a file, as well as storage item manipulation operations to rename, delete, copy, or get details, such as metadata, of files or folders. Note that folders may also be referred to herein as "directories."

In particular embodiments, storage items such as files and folders in a file server namespace may be accessed by clients, such as user VMs, by name, e.g., "\Folder-1\File-1" and "\Folder-2\File-2" for two different files named File-1 and File-2 in the folders Folder-1 and Folder-2, respectively (where Folder-1 and Folder-2 are sub-folders of the root folder). Names that identify files in the namespace using folder names and file names may be referred to as "path names." Client systems may access the storage items stored on the VFS instance by specifying the file names or path names, e.g., the path name "\Folder-1\File-1", in storage access operations. If the storage items are stored on a share (e.g., a shared drive), then the share name may be used to access the storage items, e.g., via the path name "\\Share-1\Folder-1\File-1" to access File-1 in folder Folder-1 on a share named Share-1.

In particular embodiments, although the VFS may store different folders, files, or portions thereof at different locations, e.g., on different FSVMs, the use of different FSVMs or other elements of storage pool 270 to store the folders and files may be hidden from the accessing clients. The share name is not necessarily a name of a location such as an FSVM or host machine, example, the name Share-1 does not identify a particular FSVM on which storage items of the share are located. The share Share-1 may have portions of storage items stored on three host machines, but a user may simply access Share-1, e.g., by mapping Share-1 to a client computer, to gain access to the storage items on Share-1 as if they were located on the client computer. Names of storage items, such as file names and folder names, may similarly be location-independent. Thus, although storage items, such as files and their containing folders and shares, may be stored at different locations, such as different host machines, the files may be accessed in a location-transparent manner by clients (such as the user VMs). Thus, users at client systems need not specify or know the locations of each storage item being accessed. The VFS may automatically map the file names, folder names, or full path names to the locations at which the storage items are stored. As an example and not by way of limitation, a storage item's location may be specified by the name, address, or identity of the FSVM that provides access to the storage item on the host machine on which the storage item is located. A storage item such as a file may be divided into multiple parts that may be located on different FSVMs, in which case access requests for a particular portion of the file may be automatically mapped to the location of the portion of the file based on the portion of the file being accessed (e.g., the offset from the beginning of the file and the number of bytes being accessed).

In particular embodiments, VFS 266 determines the location, e.g., FSVM, at which to store a storage item when the storage item is created. For example, a FSVM 246 may attempt to create a file or folder using a CVM 236 on the same host machine 204 as the user VM 210 that requested creation of the file, so that the CVM 236 that controls access operations to the file folder is co-located with the user VM 210. While operations with a CVM are described herein, the operations could also or instead occur using a hypervisor and/or container in some examples. In this way, since the user VM 210 is known to be associated with the file or folder and is thus likely to access the file again, e.g., in the near future or on behalf of the same user, access operations may use local communication or short-distance communication to improve performance, e.g., by reducing access times or increasing access throughput. If there is a local CVM on the same host machine as the FSVM, the FSVM may identify it and use it by default. If there is no local CVM on the same host machine as the FSVM, a delay may be incurred for communication between the FSVM and a CVM on a different host machine. Further, the VFS 266 may also attempt to store the file on a storage device that is local to the CVM being used to create the file, such as local storage, so that storage access operations between the CVM and local storage may use local or short-distance communication.

In some examples, if a CVM is unable to store the storage item in local storage of a host machine on which an FSVM resides, e.g., because local storage does not have sufficient available free space, then the file may be stored in local storage of a different host machine. In this case, the stored file is not physically local to the host machine, but storage access operations for the file are performed by the locally-associated CVM and FSVM, and the CVM may communicate with local storage on the remote host machine using a network file sharing protocol, e.g., iSCSI, SAMBA, or the like.

In some examples, if a virtual machine, such as a user VM 212, CVM 236, or FSVM 246, moves from a host machine 204 to a destination host machine 206, e.g., because of resource availability changes, and data items such as files or folders associated with the VM are not locally accessible on the destination host machine 206, then data migration may be performed for the data items associated with the moved VM to migrate them to the new host machine 206, so that they are local to the moved VM on the new host machine 204. FSVMs may detect removal and addition of CVMs (as may occur, for example, when a CVM fails or is shut down) via the iSCSI protocol or other technique, such as heartbeat messages. As another example, a FSVM may determine that a particular file's location is to be changed, e.g., because a disk on which the file is stored is becoming full, because changing the file's location is likely to reduce network communication delays and therefore improve performance, or for other reasons. Upon determining that a file is to be moved, VFS 266 may change the location of the file by, for example, copying the file from its existing location(s), such as local storage 252 of a host machine 204, to its new location(s), such as local storage 254 of host machine 206 (and to or from other host machines, such as local storage 256 of host machine 208 if appropriate), and deleting the file from its existing location(s). Write operations on the file may be blocked or queued while the file is being copied, so that the copy is consistent. The VFS 266 may also redirect storage access requests for the file from an FSVM at the file's existing location to a. FSVM at the file's new location.

In particular embodiments, VFS 266 includes at least three File Server Virtual Machines (FSVMs) 246, 248, 250 located on three respective host machines 204, 206, 208. To provide high-availability, in some examples, there may be a maximum of one FSVM for a particular VFS instance VFS 266 per host machine in a cluster. If two FSVMs are detected on a single host machine, then one of the FSVMs may be moved to another host machine automatically in some examples, or the user (e.g., system administrator) may be notified to move the FSVM to another host machine. The user may move a FSVM to another host machine using an administrative interface that provides commands for starting, stopping, and moving FSVMs between host machines.

In some examples, two FSVMs of different VFS instances may reside on the same host machine. If the host machine fails, the FSVMs on the host machine become unavailable, at least until the host machine recovers. Thus, if there is at most one FSVM for each VFS instance on each host machine, then at most one of the FSVMs may be lost per VFS per failed host machine. As an example, if more than one FSVM for a particular VFS instance were to reside on a host machine, and the VFS instance includes three host machines and three FSVMs, then loss of one host machine would result in loss of two-thirds of the FSVMs for the VFS instance, which may be more disruptive and more difficult to recover from than loss of one-third of the FSVMs for the VFS instance.

In some examples, users, such as system administrators or other users of the system and/or user VMs, may expand the cluster of FSVMs by adding additional FSVMs. Each FSVM may be associated with at least one network address, such as an IP (Internet Protocol) address of the host machine on which the FSVM resides. There may be multiple clusters, and all FSVMs of a particular VFS instance are ordinarily in the same cluster. The VFS instance may be a member of a MICROSOFT ACTIVE DIRECTORY domain, which may provide authentication and other services such as name service.

In some examples, files hosted by a virtualized file server, such as the VFS 266, may be provided in shares—e.g., SMB shares and/or NFS exports. SMB shares may be distributed shares (e.g., home shares) and/or standard shares (e.g., general shares). NFS exports may be distributed exports (e.g., sharded exports) and/or standard exports (e.g., non-sharded exports). A standard share may in some examples be an SMB share and/or an NFS export hosted by a single FSVM (e.g., FSVM 246, FSVM 248, and/or FSVM 250 of FIG. 2). The standard share may be stored, e.g., in the storage pool in one or more volume groups and/or vDisks and may be hosted (e.g., accessed and/or managed) by the single FSVM. The standard share may correspond to a particular folder (e.g., \\enterprise\finance may be hosted on one FSVM, \\enterprise\hr on another FSVM). In some examples, distributed shares may be used which may distribute hosting of a top-level directory (e.g., a folder) across multiple FSVMs. So, for example, \\enterprise\users\ann and \\enterprise\users\bob may be hosted at a first FSVM, while \\enterprise\users\chris and \\enterprise\users\dan are hosted at a second FSVM. In this manner a top-level directory (e.g., \\enterprise\users) may be hosted across multiple FSVMs. This may also be referred to as a sharded or distributed share (e.g., a sharded SMB share). As discussed, a distributed file system protocol, e.g., MICROSOFT DFS or the like, may be used, in which a user VM may request the addresses of FSVMs 246, 248, 250 from a name service (e.g., DNS).

Accordingly, systems described herein may include one or more virtual file servers, where each virtual file server may include a cluster of file server VMs and/or containers operating together to provide a file system. Examples of systems described herein may include a distributed lock management system to manage locks on shared resources 242 of a distributed computing system 200, which may, in some embodiments, include locks on files, directories, shares, or other components of a virtualized file system as described above hosted on the distributed computing system 200.

Figure 3:
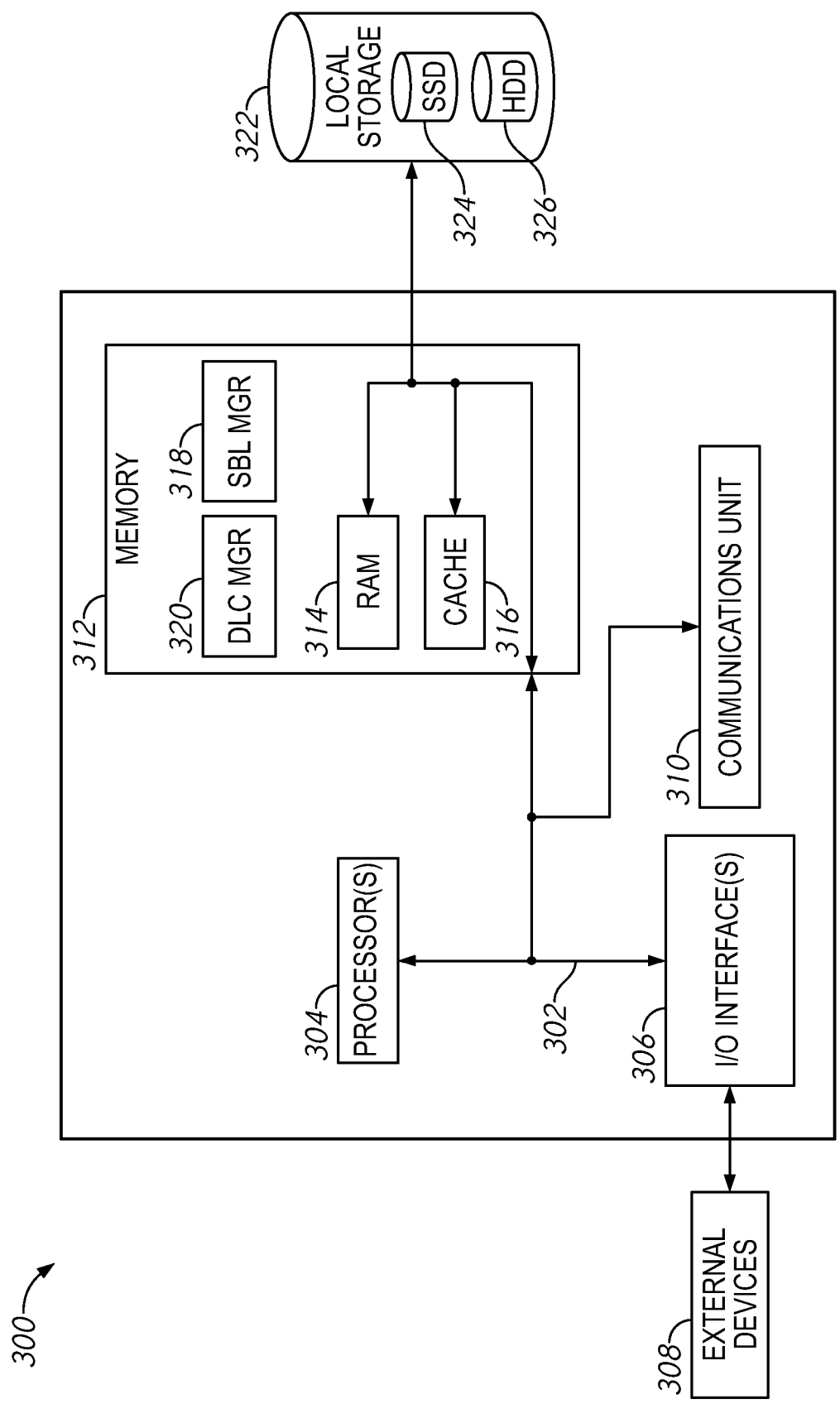
FIG. 3 depicts a block diagram of components of a computing node (e.g., device) in accordance with embodiments of the present disclosure.

FIG. 3 depicts a block diagram of a computing node (device) 300 in accordance with embodiments of the present disclosure. It should be appreciated that FIG. 3 provides only an illustration of one implementation and does not imply any limitations with regards to the environments in which different embodiments may be implemented. Many modifications to the depicted environment may be made. The computing node 300 may be implemented as at least part of the system 100 of FIG. 1, the distributed computing system 200 of FIG. 2, or other computing devices described herein. In some examples, the computing node 300 may be a standalone computing node or part of a cluster of computing nodes configured to host a scope-based lock manager 114 or scope-based lock manager 228.

The computing node 300 includes a communications fabric 302, which provides communications between one or more processor(s) 304, memory 312, local storage 322, communications unit 310, and I/O interface(s) 306. The communications fabric 302 can be implemented with any architecture designed for passing data and/or control information between processors (such as microprocessors, communications and network processors, etc.), system memory, peripheral devices, and any other hardware components within a system. For example the communications fabric 302 can be implemented with one or more buses.

The memory 312 and local storage 322 are computer-readable storage media. In various embodiments, the memory 312 includes random access memory RAM 314 and cache 316. In general, the memory 312 may include any suitable volatile or non-volatile computer-readable storage media. In some embodiments, the local storage 322 includes an SSD 324 and an HDD 326.

Various computer instructions, programs, files, images, etc. may be stored in local storage 322 for execution by one or more of the respective processor(s) 304 via one or more memories of memory 312. In some examples, local storage 322 includes a magnetic HDD 326. Alternatively or in addition to a magnetic hard disk drive, local storage 322 can include the SSD 324, a semiconductor storage device, a read-only memory (ROM), an erasable programmable read-only memory (EMPROM), a flash memory, or any other computer-readable storage media that is capable of storing program instructions or digital information.

The media used by local storage 322 may also be removable. For example, a removable hard drive may be used for local storage 322. Other examples include optical and magnetic disks, thumb drives, and smart cards that are inserted into a drive for transfer onto another computer-readable storage medium that is also part of local storage 322. The local storage 322 may be configured to store executable instructions for the scope-based lock manager 114 and/or the distributed lock cleanup manager 116 in various embodiments.

Communications unit 310, in these examples, provides for communications with other data processing systems or devices. In these examples, communications unit 310 includes one or more network interface cards. Communications unit 310 may provide communications through the use of either or both physical and wireless communications links.

I/O interface(s) 306 allow for input and output of data with other devices that may be connected to computing node 300. For example, I/O interface(s) 306 may provide a connection to external devices 308 such as a keyboard, a keypad, a touch screen, and/or some other suitable input device. External devices 308 can also include portable computer-readable storage media such as, for example, thumb drives, portable optical or magnetic disks, and memory cards. Software and data used to practice embodiments of the present disclosure can be stored on such portable computer-readable storage media and can be loaded onto local storage 322 via I/O interface(s) 306. I/O interface(s) 306 may also connect to external devices 308 providing output, such as a display. A display may provide a mechanism to display data to a user and may be, for example, a computer monitor.

Figure 4:
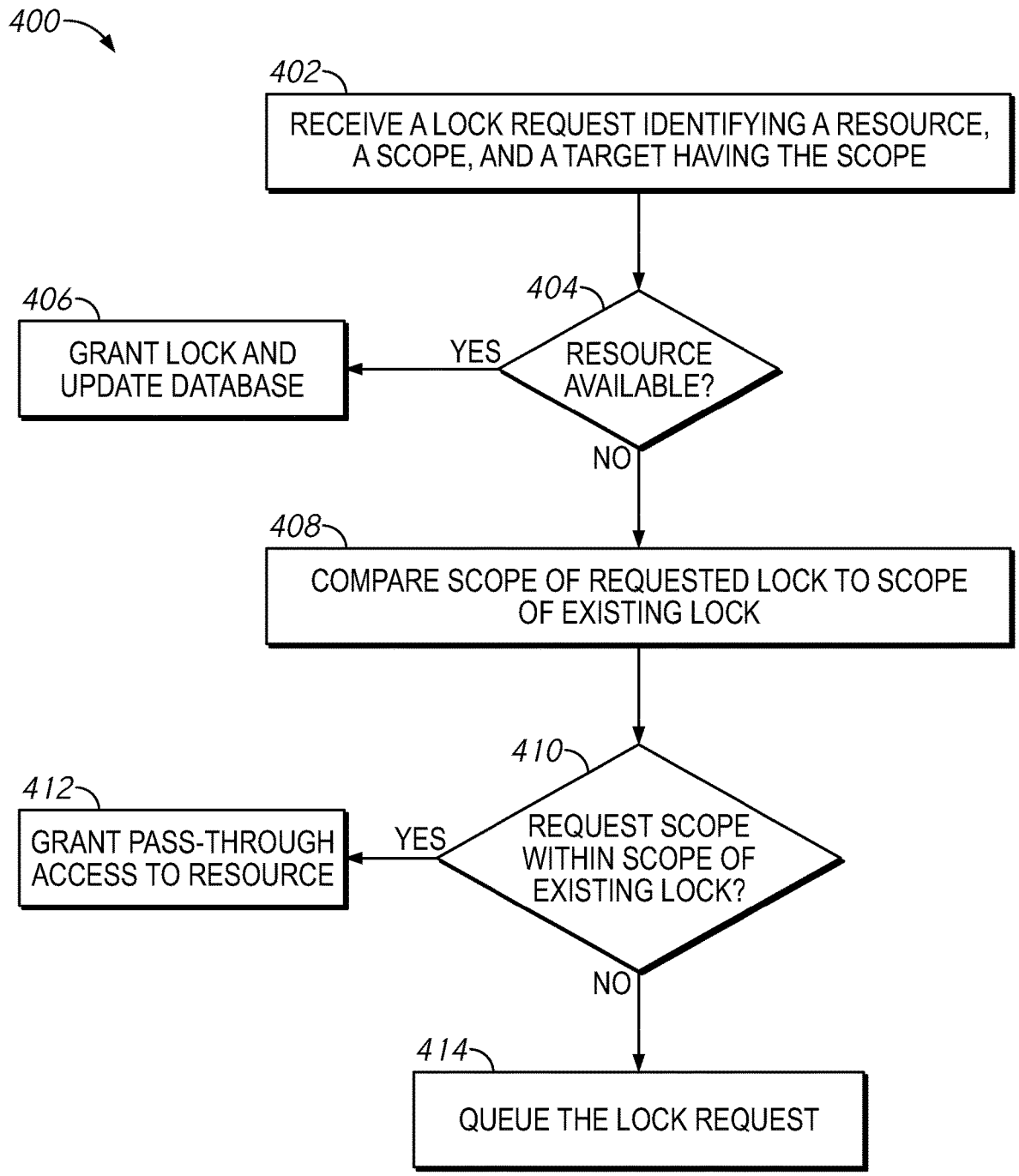
FIG. 4 illustrates an example process for processing and granting lock requests by a scope-based lock manager, in accordance with embodiments of the present disclosure.

FIG. 4 illustrates an exemplary process for processing and granting lock requests by a scope-based lock manager, in accordance with embodiments of the present disclosure. While the process is described with respect to the scope-based lock manager 228, the process may be performed by the scope-based lock manager 114 or other scope-based lock managers described within the disclosure. At block 402, the scope-based lock manager 228 receives a lock request identifying a resource, a scope, and a target having the scope. In various embodiments, the scope-based lock manager 228 may receive the request from a distributed lock cleanup manager 222, 224 or 226 on behalf of an entity executing at one or more of the nodes of the distributed computing system 200. In some embodiments, the scope-based lock manager 228 may receive the request from an external entity. For example, the scope-based lock manager 228 may receive a request from node 206 requesting to lock a resource (e.g., a file) of shared resources 242. The lock request may be requested of node scope of the target node 206. Other lock requests may be made in other examples.

At block 404, the scope-based lock manager 228 determines whether the resource requested in the lock request is available. A resource may be available when the lock database 258 does not include an entry for a lock on the resource. In some embodiments, the requested resource may be a portion of a larger resource (e.g., a row of a spreadsheet, a page of a file, a file in a directory, etc.) and the resource may further be available when no conflicting locks are granted (e.g., entered in the lock database 258) on the larger resource (e.g., the spreadsheet, the file, the directory, etc.). A conflicting lock may be a lock on the larger resource not allowing for granting of locks on portions of the resource.

For example, to process a request to lock a row of a spreadsheet for exclusive write access to a process executing on the node 208, the scope-based lock manager 228 may review the lock database 258 for entries showing locks on the same row of the spreadsheet or locks on the spreadsheet as a whole that would preclude granting the requested lock. For example, where the lock database 258 contains an entry showing that the spreadsheet is locked for exclusive write access, the resource (the particular row of the spreadsheet) is not available for the requested lock. Where, however, the lock database 258 contains an entry showing that the spreadsheet is locked for non-exclusive read access, the resource (the row of the spreadsheet) may be available for the requested lock, as a grant of exclusive write access for a row of the spreadsheet does not conflict with non-exclusive read access for the whole spreadsheet.

Where the resource is available (e.g., no other locks are held on the resource or on a larger resource including the resource), the scope-based lock manager 228 proceeds to block 406 to grant the requested lock and update the lock database 258. The scope-based lock manager 228 may update the lock database 258 to include the resource locked by the lock, a target identifier identifying the entity holding the lock. In some embodiments, the scope-based lock manager 228 may store the scope of the lock, type of the lock (e.g., an exclusive or non-exclusive lock, a read lock, a write lock, a read/write lock, etc.), or other information used to manage the lock. For example, the lock may be stored with an IP address or other identifier of a distributed lock cleanup manager responsible for polling the requesting entity to initiate lock cleanup requests for the lock. At block 406, the scope-based lock manager 228 may communicate an updated request status to the target of the granted lock request indicating that the lock has been granted by the scope-based lock manager 228.

Where the scope-based lock manager 228 determines, at block 404, that the resource is not available, the scope-based lock manager 228 compares the scope of the requested lock to a scope of an existing lock (or locks) granted for the resource. In various embodiments, the scope-based lock manager 228 may compare the scope of locks on related resources (e.g., a lock on an entire file where the request is for a lock on a portion of a file) to the scope of the requested lock. In some embodiments, the comparison may include a comparison of the target identifiers of the existing lock or locks and the requested lock. For example, a process executing on node 208 may request a lock on a directory of a shared VFS. The target of the requesting lock may then be expressed using an identifier including N208, P1—reflecting that the requesting entity is a process identified by P1 executing on node 208. An existing lock on the directory may be held by the node 206, with a target expressed as N206—reflecting that the target is the node 206.

At block 410, the scope-based lock manager 228 determines whether the scope of the requested lock is within the scope of the existing lock. Continuing with the previous example, the determination may be based on the comparison between the scope of the existing lock and the scope of the requesting lock. The scope-based lock manager 228 may determine that a lock of a resource requested by a process with an identifier N208, P1 is outside of the scope of an existing lock with a target having an identifier N206 as no parts of the identifiers match. For example, if the existing lock were held by node 208 (e.g., the target of the existing lock would have the identifier N208), the scope-based lock manager 228 may determine that the scope of the requesting lock is within the scope of the existing lock because the only node identifier included in the identifier of the requesting entity is the identifier of the target of the existing lock. Because the requesting lock identifier does not include another node identifier, the scope-based lock manager 228 may determine that the requesting process is entirely hosted by the node 208. In contrast, a distributed application including multiple node identifiers in an identifier of the distributed application would not be within the scope of a lock held by a single node, as processes not hosted by the node holding the lock are included in the distributed application.

Where the scope of the requested lock is within the scope of the existing lock on the resource, the scope-based lock manager 228 may grant pass-through access to the resource at block 412. Granting pass-through access may, in some embodiments, be based on the type of lock requested. For example, if a process requests a lock providing exclusive access to a resource to the process, the scope-based lock manager 228 may not provide pass-through access to the resource to the process where an existing lock is held by the node hosting the process, as granting the pass-through access may not provide the exclusive access requested by, the process. The scope-based lock manager 228 may, responsive to these occurrences, in various embodiments, respond by queueing the lock request or by offering reduced access (e.g., non-exclusive access) to the requesting entity and queuing the request if the requesting entity declines the reduced access in favor of the requested lock. In some embodiments, the scope-based lock manager 228 may both grant pass-through access and queue a lock request, so the requesting entity may access the resource for some operations, while still maintaining a request for the more exclusive lock. In some embodiments, the scope-based lock manager 228 may add information about the pass-through access to the lock database 258 such that if, for example, a node releases a node scope lock, the process accessing the resource by pass-through access does not lose its access to another request.

Where the scope-based lock manager 8 determines, at block 410, that the scope of the requested lock is not within the scope of the existing lock, the scope-based lock manager 228 queues the lock request at block 414. To queue the lock request, the scope-based lock manager 228 may store the request, along with other information (e.g., callback information for communication with the requesting entity), in a queue. Some lock requests may be provided without callback information or with a request for only immediate access to the resource (e.g., a synchronous lock request). Such lock requests may, at block 410, be processed by providing a "lock denied" communication to the requesting entity in place of queuing the lock request. Communication between the scope-based lock manager 228 and requesting entities may, in various implementations, be accomplished by communicating with a distributed lock cleanup manager responsible for polling the requesting entity.

Figure 5:
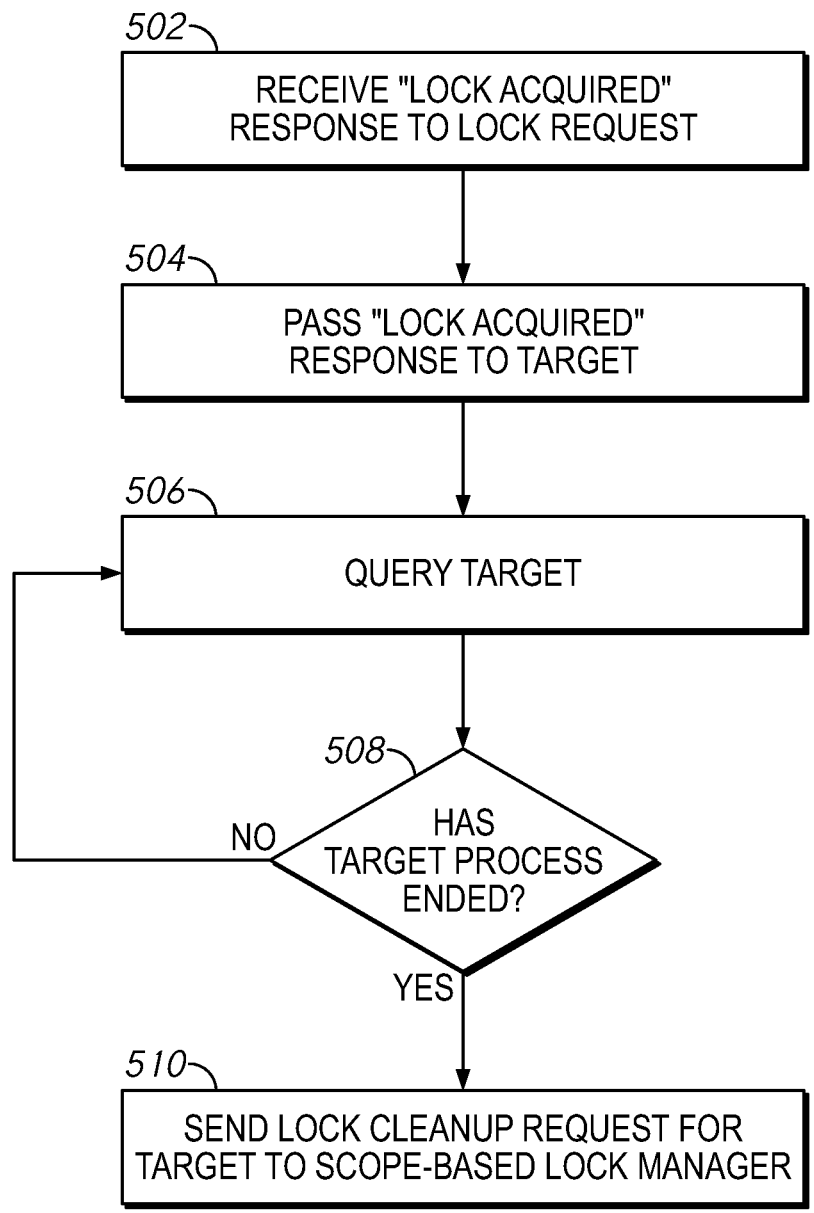
FIG. 5 illustrates an example process for polling existing locks by a distributed lock cleanup manager, in accordance with embodiments of the present disclosure.

FIG. 5 illustrates an exemplary process for polling existing locks by a distributed lock cleanup manager, in accordance with embodiments of the present disclosure. While FIG. 5 is described with respect to the distributed lock cleanup manager 224, any of the distributed lock cleanup managers described herein may perform the process described in FIG. 5, or variations thereof, to poll existing locks.

At block 502 the distributed lock cleanup manager 224 receives a lock acquired response from the scope-based lock manager 228 responsive to a lock request. For example, the lock acquired response may be received when the scope-based lock manager 228 grants a lock request at block 406 of FIG. 4. The lock acquired response may be received from the scope-based lock manager 228 when the lock request is removed from a queue and the lock is granted. The distributed lock cleanup manager 224 passes the lock acquired response to the target of the initial lock request at block 504.

At block 506, the distributed lock cleanup manager 224 queries the target. In various embodiments, the distributed lock cleanup manager 224 may be configured to query the target at specified intervals while the target holds a lock granted by the scope-based lock manager 228. The distributed lock cleanup manager 224 may, in some implementations, query the target responsive to certain events, such as when otherwise communicating with the scope-based lock manager 228 or after a timeout interval has passed without communications from the target. The distributed lock cleanup manager 224 may receive a response from the target responsive to the query, indicating that the process of the target has not ended or otherwise terminated. When the distributed lock cleanup manager 224 does not receive any response to its query, the distributed lock cleanup manager 224 may determine that the process has ended or terminated.

At block 508, if the target process has not ended, the distributed lock cleanup manager 224 returns to block 506 and continues to query the process. In some embodiments, the distributed lock cleanup manager 224 may stop querying the process after receiving a communication from the process requesting that the distributed lock cleanup manager 224 communicate with the scope-based lock manager 228 to relinquish the lock on behalf of the process, ending the process shown in FIG. 5.

If the distributed lock cleanup manager 224 determines, at block 508, that the target process has ended, the distributed lock cleanup manager 224 sends a lock cleanup request for the target to the scope-based lock manager 228 at block 510. The lock cleanup request may include an identifier of the target to allow the scope-based lock manager 228 to cleanup locks and lock requests within the scope of the target. For example a failed process previously executing on node 208, may have an identifier including N208, P2—indicating that the process is executing at node 208.

Figure 6:
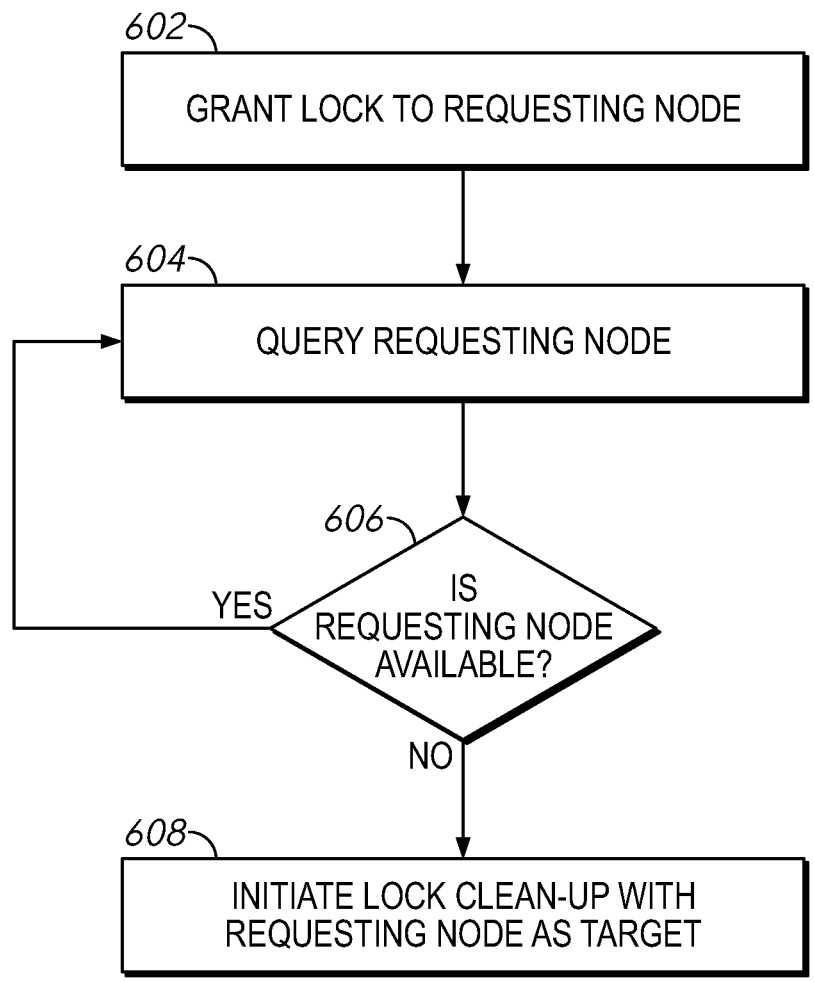
FIG. 6 illustrates an example process for polling existing locks by a scope-based lock manager, in accordance with embodiments of the present disclosure.

FIG. 6 illustrates an exemplary process for polling existing locks by a scope-based lock manager 228, in accordance with embodiments of the present disclosure. While FIG. 6 is described with respect to the scope-based lock manager 228, any scope-based lock manager described herein may perform the process described in FIG. 6, or variations thereof, to poll existing locks. In some embodiments, the scope-based lock manager 228 may perform the process of FIG. 6 for node scope locks. In some embodiments, the scope-based lock manager 228 may perform the process of FIG. 6 for all locks in the lock database 258, in conjunction with the process performed by the distributed lock cleanup manager 224 described in FIG. 5. Accordingly, the scope-based lock manager 228 may continually poll nodes encompassing entities holding locks in the lock database 258, such that, should a node become unavailable, the scope-based lock manager 228 can clean up all locks held by entities hosted by the unavailable node, instead of relying on the distributed lock cleanup manager 224 at the node to initiate lock cleanup requests.

At block 602, the scope-based lock manager 228 grants a lock to the requesting node. Granting a lock to the requesting node may include, for example, granting a lock to an application, process, or other entity executing at a requesting node. As described herein, granting the lock may include storing lock information for the granted lock in the lock database 258, including an identifier of the target holding the granted lock. The scope-based lock manager 228 may communicate a "lock granted" status to the requesting node hosting the target of the granted lock as part of block 602.

The scope-based lock manager 228 queries the requesting node at block 604. In various embodiments, the scope-based lock manager 228 may routinely query all nodes in the distributed computing system 200 to ensure all nodes are operational. The scope-based lock manager 228 may query some subset of the nodes of the distributed computing system 200 when, for example, a node of the distributed computing system does not host any processes currently holding locks on shared resources of the distributed computing system 200. In various embodiments, the scope-based lock manager 228 may be configured to query nodes responsive to a timeout period elapsing without receiving communications from a particular node, indicating that the node may have failed. In some embodiments, the scope-based lock manager 228 may instead query all of the nodes distributed computing system 200 at a predetermined interval.

If the scope-based lock manager 228 determines, at block 606, that the requesting node is available, the scope-based lock manager 228 returns to block 604 and continues querying the requesting node. The scope-based lock manager 228 may determine that a node is available when the scope-based lock manager 228 receives a response to the query of the node or another communication from the node, showing that the node has not failed.

If the scope-based lock manager 228 determines, at block 606, that the requesting node is not available, the scope-based lock manager 228 initiates lock clean-up with the requesting node as the target at block 608. Initiating a lock cleanup request may include performing the process of FIG. 7 with the unavailable node as the target.

In some embodiments, the distributed lock system may be configured to handle failure of the node hosting the scope-based lock manager 228 in a similar manner. For example, where distributed lock managers hosted on other nodes of the distributed computing system 200 do not receive communications from the node hosting the scope-based lock manager 228 after a timeout period or other predetermined time unit, one of the remaining nodes may initiate a new instance of the scope-based lock manager using the lock database 258 and the priority queue to restore the state of the scope-based lock manager 228 before failure. The new instance of the scope-based lock manager may then perform the process of FIG. 7 with the failed node as the target for the cleanup request.

Figure 7:
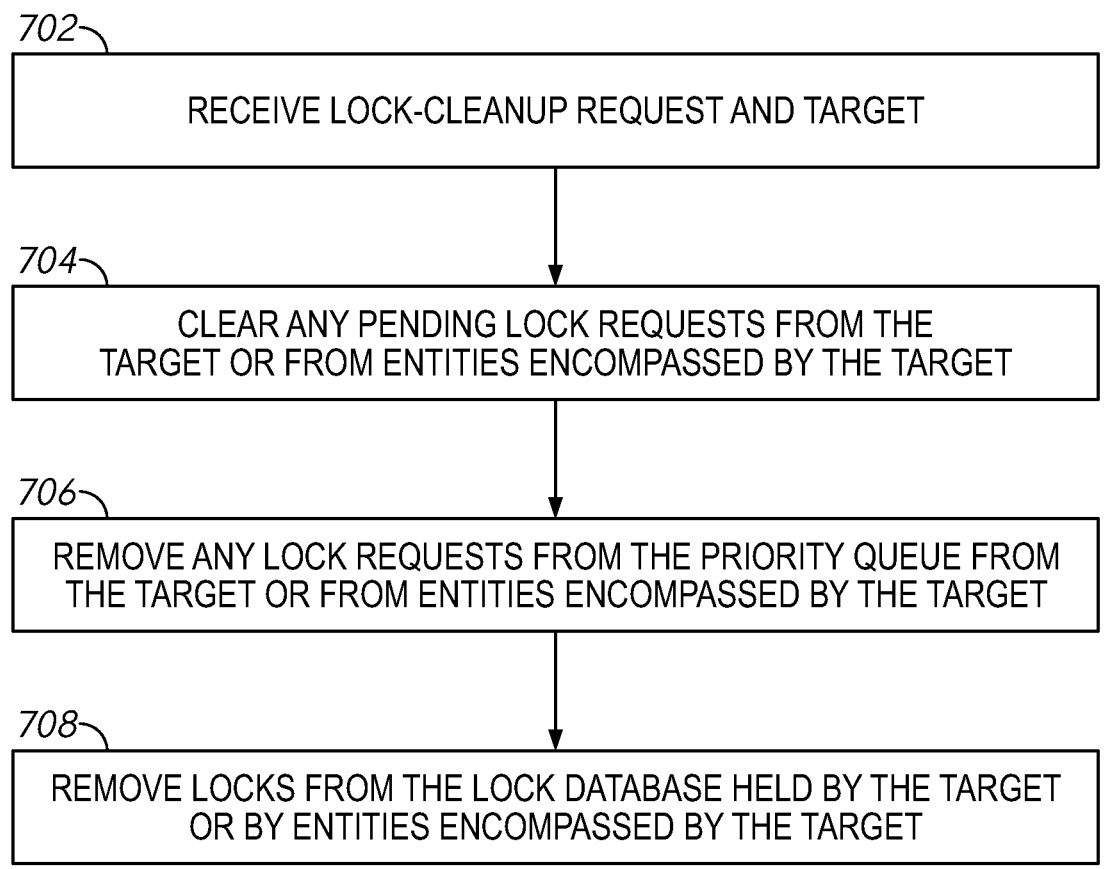
FIG. 7 illustrates an example process for lock cleanup by a scope-based lock manager, in accordance with embodiments of the present disclosure.

FIG. 7 illustrates an exemplary process for lock cleanup by a scope-based lock manager 228, in accordance with embodiments of the present disclosure. While FIG. 7 is described with respect to the scope-based lock manager 228, any scope-based lock manager described herein may perform the process described in FIG. 7, or variations thereof, to perform lock cleanup.

At block 702, the scope-based lock manager 8 receives a lock cleanup request including a target of the lock cleanup request. The target of the lock may be, for example, a node of the distributed computing system 200 (where the lock cleanup request is generated by the process of FIG. 6) or another entity (e.g., where the lock cleanup request is received from a distributed lock cleanup manager after the process of FIG. 5). In various embodiments, the target may be identified in the lock cleanup request by an identifier of processes included in the target and a node (or nodes) of the distributed computing system 200 hosting the processes of the target.

The scope-based lock manager 228 clears any pending lock requests from the target or from entities encompassed by the target at block 704. For example, the scope-based lock manager 228 may queue lock requests from entities of the distributed computing system 200 prior to processing the requests by either granting the requests, queuing the requests, or denying the requests. The scope-based lock manager 228 may identify requests from the target or from entities encompassed by the target by comparing identifiers of the targets of the pending requests to the target identifier of the cleanup request. An exact match between an identifier of a target of a pending request and the target identifier of the cleanup request indicates that the request is from the target.

A partial match between an identifier of a pending request and the identifier of the target of the cleanup request may mean the target of the pending request is encompassed by the target of the cleanup request where the identifier of the target of the pending request does not include identifiers of entities larger than the target of the cleanup request not included in the identifier of the target of the cleanup request. For example, where a node with identifier N1 is the target of the cleanup request, a request from a target having an identifier N1, P1, T1 is within the scope of the target of the cleanup, and the request will be removed from the pending lock queue at block 704. However, in the same cleanup operation, a request from a target having an identifier N1, P1, N2, P2 (e.g., a service including processes executing at two nodes) is not within the scope of the target of the cleanup request and may not be removed from the queue or list of pending lock requests. In some embodiments, the scope-based lock manager 228 may modify the targets of such lock requests to reflect the lock cleanup. For example, the scope-based lock manager 228 may update the identifier of a target of a lock request from N1, P1, N2, P2 to N2, P2 responsive to a lock cleanup having N1 as a target.

At block 706, the scope-based lock manager 228 removes any lock requests from the priority queue from the target or from entities encompassed by the target. The scope-based lock manager 228 may use a similar method as described for block 704 to identify requests in the priority queue from the target or from entities encompassed by the target. The scope-based lock manager 228 removes locks from the lock database held by the target or held by entities encompassed by the target at block 708 using the same methods of identifying locks held by the target or by entities encompassed by the target.

After a lock cleanup operation as described with respect to FIG. 7, the scope-based lock manager 228 may continue with the process of granting and releasing locks for the shared resources 242 of the distributed computing system 200. Accordingly, the scope-based lock manager 228 may allow for fewer disruptions to user operations and other processes of a distributed computing system 200 due to failure of nodes in the distributed computing system 200, providing a more robust and reliable method of sharing resources of a distributed computing system 200.

Of course, it is to be appreciated that any one of the examples, embodiments or processes described herein may be combined with one or more other examples, embodiments and/or processes or be separated and/or performed amongst separate devices or device portions in accordance with the present systems, devices and methods.

Finally, the above-discussion is intended to be merely illustrative of the present system and should not be construed as limiting the appended claims to any particular embodiment or group of embodiments. Thus, while the present system has been described in particular detail with reference to exemplary embodiments, it should also be appreciated that numerous modifications and alternative embodiments may be devised by those having ordinary skill in the art without departing from the broader and intended spirit and scope of the present system as set forth in the claims that follow. Accordingly, the specification and drawings are to be regarded in an illustrative manner and are not intended to limit the scope of the appended claims.

From the foregoing it will be appreciated that, although specific embodiments have been described herein for purposes of illustration, various modifications may be made while remaining with the scope of the claimed technology.

Examples described herein may refer to various components as "coupled" or signals as being "provided to" or "received from" certain components. It is to be understood that in some examples the components are directly coupled one to another, while in other examples the components are coupled with intervening components disposed between them. Similarly, signal may be provided directly to and/or received directly from the recited components without intervening components, but also may be provided to and/or received from the certain components through intervening components.

What is claimed is:

1. One or more non-transitory computer readable media encoded with instructions that, when executed by one or more processors of a distributed computing system, cause the distributed computing system to perform operations comprising:
   granting a request for a lock of a shared resource of the distributed computing system, the request including a scope of the lock and a target having the scope, the target defining entities able to access the shared resource when locked, the scope of the lock comprising an application-level scope, a service-level scope, a node-level scope, or combinations thereof;
   storing the scope of the lock and the target at a lock database including scopes and targets associated with additional locks of the shared resource or additional shared resources of the distributed computing system;
   queuing a second request for a second lock of the shared resource when a target of the second lock encompasses entities outside of the target of the lock;
   determining that a computing node of the distributed computing system has failed; and
   removing the lock from the lock database responsive to a determination that the target of the lock is hosted by the computing node.

2. The computer readable media of claim 1, wherein the operations further comprise queueing the second request for the second lock of the shared resource responsive to a determination that the target of the second lock encompasses the entities outside of the target of the lock.

3. The computer readable media of claim 1, wherein the scope of the lock is defined with respect to the distributed computing system.

4. The computer readable media of claim 1, wherein the operations further comprise clearing, responsive to the determination that the computing node has failed, a pending lock request responsive to a determination that a target of the pending lock request is hosted by the computing node.

5. The computer readable media of claim 1, wherein the operations further comprise removing, responsive to the determination that the computing node has failed, a queued lock request from a priority queue responsive to a determination that a target of the queued lock request is hosted by the computing node.

6. The computer readable media of claim 1, wherein the operations further comprise receiving, from another node of the distributed computing system, a lock cleanup request including a cleanup target, wherein the cleanup target is a process hosted by the another node of the distributed computing system that has failed.

7. The computer readable media of claim 6, wherein the operations further comprise removing, responsive to the lock cleanup request identifying the cleanup target, one or more locks from the lock database responsive to a determination that the cleanup target is a target of the one or more locks.

8. The computer readable media of claim 6, wherein the operations further comprise clearing, responsive to the lock cleanup request identifying the cleanup target, a pending lock request responsive to a determination that a target of the pending lock request is the cleanup target.

9. The computer readable media of claim 6, wherein the operations further comprise, removing, responsive to the lock cleanup request identifying the cleanup target, a queued lock request from a priority queue responsive to a determination that a target of the queued lock request is the cleanup target.

10. A distributed computing system comprising:
a scope-based lock manager hosted by a computing node of the distributed computing system, the computing node comprising at least one processor and wherein the at least one processor is configured to execute instructions configured to cause the scope-based lock manager to perform operations comprising:
granting a request for a lock of a shared resource of the distributed computing system, the lock request including a scope of the lock and a target having the scope, the target defining entities able to access the shared resource when locked, the scope of the lock comprising an application-level scope, a service-level scope, a node-level scope, or combinations thereof;
storing the scope of the lock and the target at a lock database including scopes and targets associated with additional locks of the shared resource or of additional shared resources of the distributed computing system;
queuing a second request for a second lock of the shared resource when a target of the second lock encompasses entities outside of the target of the lock;
determining that the computing node of the distributed computing system has failed; and
removing the lock from the lock database responsive to a determination that the target of the lock is hosted by the computing node.

11. The distributed computing system of claim 10, wherein the scope-based lock manager is further configured to perform operations comprising queuing the second request for the second lock of the shared resource responsive to a determination that the target of the second lock encompasses the entities outside of the target of the lock.

12. The distributed computing system of claim 10, wherein the scope-based lock manager is further configured to perform operations comprising clearing, responsive to the determination that the computing node has failed, a pending lock request responsive to a determination that a target of the pending lock request is hosted by the computing node.

13. The distributed computing system of claim 10, wherein the scope-based lock manager is further configured to perform operations comprising removing, responsive to a determination that the computing node has failed, a queued lock request from a priority queue responsive to a determination that a target of the queued lock request is hosted by the computing node.

14. The distributed computing system of claim 10, further comprising:
a distributed lock cleanup manager hosted by a plurality of nodes of the distributed computing system, wherein the distributed lock cleanup manager is configured to perform operations comprising:
determining that a process hosted a one of the plurality of nodes of the distributed computing system has failed; and
communicating a lock cleanup request to the scope-based lock manager identifying the failed process.

15. The distributed computing system of claim 14, wherein the scope-based lock manager is further configured to perform operations comprising removing, responsive to receipt of the lock cleanup request, one or more locks from the lock database responsive to a determination that the failed process is a target of the one or more locks.

16. The distributed computing system of claim 10, wherein the lock database is stored at a shared storage location accessible to entities executing at any computing node of the distributed computing system.

17. A method comprising:
granting a request for a lock of a shared resource of a distributed computing system, wherein the request includes a scope of the lock and a target having the scope, and wherein the target defines entities able to access the shared resource when locked, the scope of the lock comprising an application-level scope, a service-level scope, a node-level scope, or combinations thereof;
storing the scope of the lock and the target at a lock database, wherein the lock database includes scopes and targets associated with additional locks of the shared resource or additional shared resources of the distributed computing system;
queuing a second request for a second lock of the shared resource when a target of the second lock encompasses entities outside of the target of the lock;
determining that a computing node of the distributed computing system has failed; and
based at least on determining that the target of the lock is hosted by the computing node, removing the lock from the lock database.

18. The method of claim 17, the method further comprising:
queueing the second request for the second lock of the shared resource responsive to a determination that the target of the second lock encompasses the entities outside of the target of the lock.

19. The method of claim 17, the method further comprising:
clearing, responsive to determining that the computing node has failed, a pending lock request responsive to a determination that a target of the pending lock request is hosted by the computing node.

20. The method of claim 17, the method further comprising:
removing, responsive to determining that the computing node has failed, a queued lock request from a priority queue responsive to a determination that a target of the queued lock request is hosted by the computing node.

21. The method of claim 17, the method further comprising:

receiving, from another node of the distributed computing system, a lock cleanup request including a cleanup target, wherein the cleanup target is a process hosted by the another node of the distributed computing system that has failed.

22. The method of claim 21, the method further comprising:
removing, responsive to the lock cleanup request identifying the cleanup target, one or more locks from the lock database responsive to a determination that a cleanup target is a target of the one or more locks.

23. The method of claim 21, the method further comprising:
clearing, responsive to the lock cleanup request identifying the cleanup target, a pending lock request responsive to a determination that a target of the pending lock request is the cleanup target.

24. The method of claim 21, the method further comprising:
removing, responsive to the lock cleanup request identifying the cleanup target, a queued lock request from a priority queue responsive to a determination that a target of the queued lock request is the cleanup target.

25. The method of claim 17, wherein the scope of the lock is defined with respect to the distributed computing system.

* * * * *